United States Patent
Brasch et al.

(10) Patent No.: US 12,450,086 B1
(45) Date of Patent: Oct. 21, 2025

(54) HOST FLEET MANAGEMENT OPTIMIZATIONS IN A CLOUD PROVIDER NETWORK

(71) Applicant: Amazon Technologies, Inc., Seattle, WA (US)

(72) Inventors: Alexandra Juliet Brasch, Seattle, WA (US); Casey Lucas Klein, Sammamish, WA (US); Kerem Bulbul, Seattle, WA (US); Philip Charles Anderson, Seattle, WA (US); Cicerone Cojocaru, Seattle, WA (US); April Nell Drees, Seattle, WA (US); Andrew C Becker, Seattle, WA (US); Ruben Ruiz Garcia, Valencia (ES)

(73) Assignee: Amazon Technologies, Inc., Seattle, WA (US)

( * ) Notice: Subject to any disclaimer, the term of this patent is extended or adjusted under 35 U.S.C. 154(b) by 600 days.

(21) Appl. No.: 17/958,091

(22) Filed: Sep. 30, 2022

(51) Int. Cl.
  *G06F 9/455* (2018.01)
  *G06F 9/50* (2006.01)
  *G06F 17/11* (2006.01)

(52) U.S. Cl.
  CPC ........ *G06F 9/45558* (2013.01); *G06F 9/5077* (2013.01); *G06F 17/11* (2013.01); *G06F 2009/4557* (2013.01); *G06F 2009/45595* (2013.01)

(58) Field of Classification Search
  CPC ................................. G06F 9/45558
  USPC ............................................. 718/1
  See application file for complete search history.

(56) References Cited

U.S. PATENT DOCUMENTS

| | | | |
|---|---|---|---|
| 10,042,676 B1* | 8/2018 | Wei | G06F 9/5077 |
| 10,067,785 B1* | 9/2018 | Wei | G06F 9/505 |
| 10,680,969 B1* | 6/2020 | Quinn | H04L 47/83 |
| 11,016,816 B1* | 5/2021 | Gupta | G06F 9/5088 |
| 11,036,537 B1* | 6/2021 | Quinn | G06F 9/45558 |
| 11,080,097 B1* | 8/2021 | Panghal | G06F 9/5027 |
| 11,221,887 B2* | 1/2022 | Gabrielson | G06F 9/5038 |
| 11,470,144 B1* | 10/2022 | Maurya | H04L 41/0896 |
| 2010/0246405 A1* | 9/2010 | Potkonjak | G01S 5/14 370/310 |
| 2010/0306382 A1* | 12/2010 | Cardosa | G06F 9/45558 718/1 |
| 2011/0202925 A1* | 8/2011 | Banerjee | G06F 11/3452 718/104 |

(Continued)

*Primary Examiner* — Mehran Kamran
(74) *Attorney, Agent, or Firm* — Nicholson DeVos Webster & Elliott LLP

(57) ABSTRACT

Techniques for host fleet management in a cloud provider network are described. Forecast data including a forecasted demand for virtual machines in each capacity pool of a set of capacity pools is obtained. A mathematical optimizer application is executed to generate a first optimal fleet plan, the mathematical optimizer application having an objective function to minimize a number of new host computer systems to add to the set of host computer systems to satisfy the forecasted demand for each capacity pool, the first optimal fleet plan includes an identification of a set of hardware types and, for each hardware type in the set, a quantity of new host computer systems of the hardware type. A plurality of new host computer systems is deployed, based on the first optimal fleet plan, for a hardware type in the set of hardware types into the set of host computer systems.

20 Claims, 16 Drawing Sheets

(56) References Cited

U.S. PATENT DOCUMENTS

| | | | |
|---|---|---|---|
| 2012/0066684 A1* | 3/2012 | Takami | G06F 9/5083 |
| | | | 718/102 |
| 2013/0042123 A1* | 2/2013 | Smith | G06F 9/5077 |
| | | | 713/300 |
| 2014/0196027 A1* | 7/2014 | Osogami | G06F 9/45558 |
| | | | 718/1 |
| 2014/0215464 A1* | 7/2014 | Birke | G06F 9/5027 |
| | | | 718/1 |
| 2016/0057074 A1* | 2/2016 | Jacobs | G06F 9/45558 |
| | | | 709/226 |
| 2019/0317829 A1* | 10/2019 | Brown | G06F 9/5077 |
| 2020/0218571 A1* | 7/2020 | Chen | H04L 67/10 |
| 2020/0379818 A1* | 12/2020 | Kiraly | G06F 9/5072 |
| 2021/0144056 A1* | 5/2021 | Chakrapani Rangarajan | |
| | | | H04L 41/5012 |
| 2021/0216351 A1* | 7/2021 | Chaterji | G06F 9/3891 |
| 2022/0244993 A1* | 8/2022 | MacDonald | G06F 11/3433 |
| 2023/0004436 A1* | 1/2023 | Bai | G06F 1/3228 |
| 2024/0111603 A1* | 4/2024 | Krasilnikov | G06F 9/5077 |

* cited by examiner

OPERATIONS
1300

OBTAINING FIRST FORECAST DATA INCLUDING A FORECASTED DEMAND FOR VIRTUAL MACHINES IN EACH CAPACITY POOL OF A SET OF CAPACITY POOLS, WHEREIN EACH CAPACITY POOL REPRESENTS A NUMBER OF SLOTS OF HOST COMPUTER SYSTEM RESOURCES FROM A SET OF HOST COMPUTER SYSTEMS FOR VIRTUAL MACHINES OF A PARTICULAR TYPE
1302

EXECUTING A MATHEMATICAL OPTIMIZER APPLICATION TO GENERATE A FIRST OPTIMAL FLEET PLAN, THE MATHEMATICAL OPTIMIZER APPLICATION HAVING AN OBJECTIVE FUNCTION TO MINIMIZE A NUMBER OF NEW HOST COMPUTER SYSTEMS TO ADD TO THE SET OF HOST COMPUTER SYSTEMS TO SATISFY THE FORECASTED DEMAND FOR EACH CAPACITY POOL, WHEREIN THE FIRST OPTIMAL FLEET PLAN INCLUDES AN IDENTIFICATION OF A SET OF HARDWARE TYPES AND, FOR EACH HARDWARE TYPE IN THE SET, A QUANTITY OF NEW HOST COMPUTER SYSTEMS OF THE HARDWARE TYPE
1304

DEPLOYING, BASED ON THE FIRST OPTIMAL FLEET PLAN, FOR A HARDWARE TYPE IN THE SET OF HARDWARE TYPES, A PLURALITY OF NEW HOST COMPUTER SYSTEMS OF THAT HARDWARE TYPE INTO THE SET OF HOST COMPUTER SYSTEMS
1306

*FIG. 13*

HOST FLEET MANAGEMENT OPTIMIZATIONS IN A CLOUD PROVIDER NETWORK

BACKGROUND

Cloud computing environments often provide on-demand, managed computing resources to customers. Such computing resources (e.g., compute and storage capacity) are often provisioned from large pools of capacity installed in data centers. Customers can request computing resources from the "cloud," and the cloud can provision compute resources to those customers. Technologies such as virtual machines and containers are often used to allow customers to securely share capacity of computer systems.

BRIEF DESCRIPTION OF DRAWINGS

Various examples in accordance with the present disclosure will be described with reference to the drawings, in which:

FIG. 13 is a flow diagram illustrating operations of a method for expanding a fleet according to some examples.

DETAILED DESCRIPTION

Figure 1:
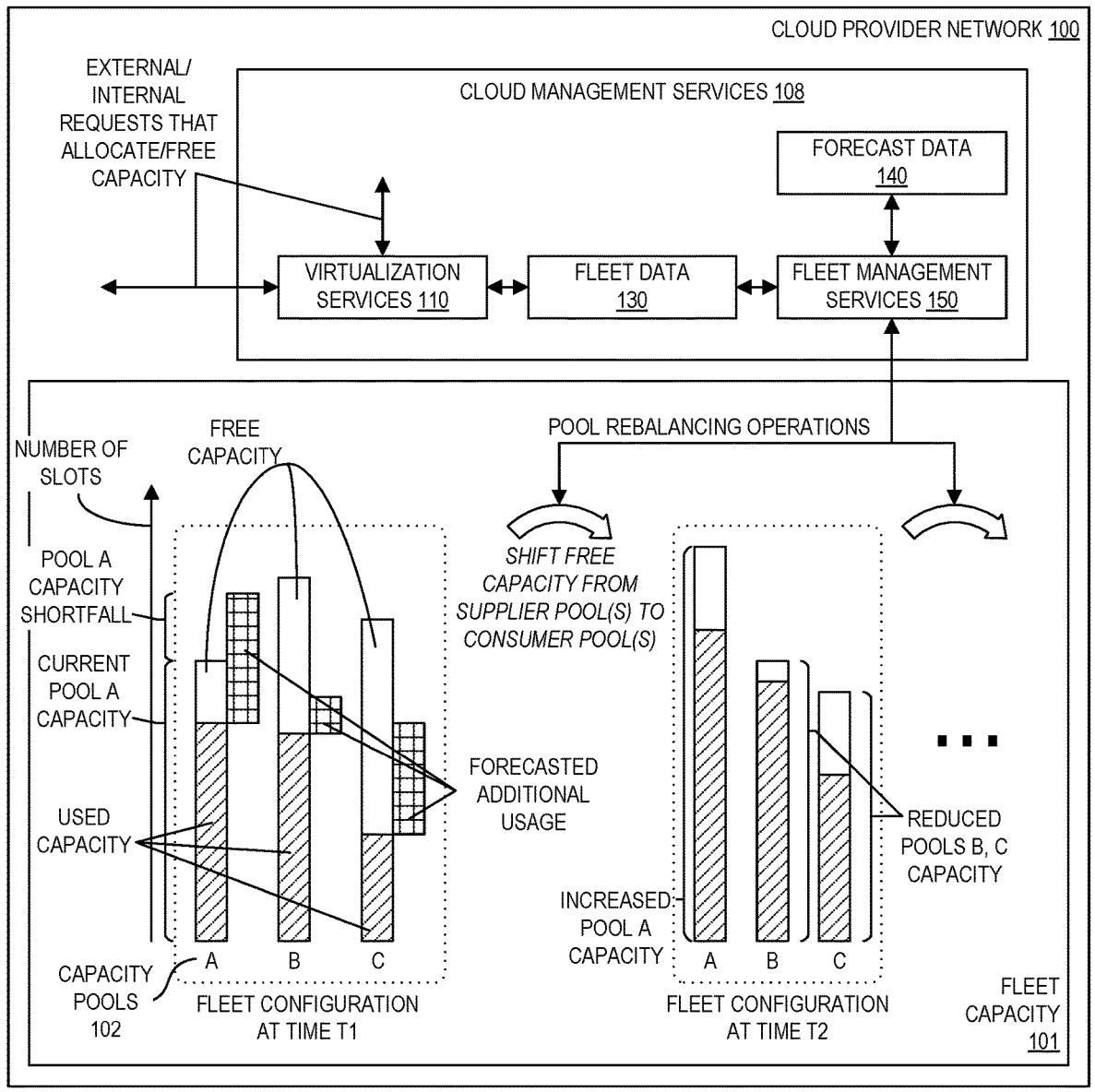
FIG. 1 is a diagram illustrating a cloud provider network environment according to some examples.

The present disclosure relates to methods, apparatus, systems, and non-transitory computer-readable storage media for host fleet optimizations in a cloud provider network (or "cloud"). While terms like "cloud-computing" and "cloud-based computing" suggest an amorphous structure, each of the servers that together form a fleet of servers (or "fleet") supporting the cloud are discrete. Today, major cloud providers can have millions of interconnected servers clustered and sited in dozens or more locations globally. Simultaneously, cloud providers typically offer a variety of virtual machines (abbreviated as "VM" and also referred to as "instances") having different performance characteristics both to customers and to provider-offered services that run on top of virtual machines. Each of these different virtual machines places different demands on the compute capacity, memory capacity, network throughput, and/or other resources of the underlying server (also referred to as "host computer system," "host system," or "host"). And cloud provider networks may be hosting tens of millions (or more) of virtual machines concurrently. Smartly allocating fleet resources to meet demand presents several challenges. These challenges include as how to divide up fleet resources to track and manage resource allocations, how to change those divisions to meet forecasted resource demands both in the short and medium term, and how to expand the fleet to meet demand in the long term. And while these challenges are amplified at the scales described above, they exist for clouds of all sizes.

Slots, hardware types, and templates—these three terms form the building blocks of an exemplary fleet organizational structure as described herein. Slots represent an amount of host resources consumed by a virtual machine. A slot can be thought of as a "specification" of the virtual machine's performance. For example, a cloud provider might advertise a virtual machine of type as having 2 virtual central processing units (vCPUs), 4 gigabytes (GB) of memory, and 500 megabits/second (Mb/s) of network throughput. The corresponding slot for that virtual machine would reflect those resource amounts. Each slot is typically associated with one virtual machine type, although if two or more virtual machine types share a specification, a slot may support more than one virtual machine type.

Typically, the hosts that make up a fleet are neither identical nor constant. With new hosts being added to the fleet (e.g., with more resources and/or additional features) and old or damaged hosts being removed, the "profile" of the fleet is in a state of change. Hosts having a common configuration and thus normally having the same amount of capacity with which to host virtual machines are assigned a unique hardware type. For example, a host 'A' with 64 CPU cores, 128 GB of memory, and 16 gigabits/second (Gb/s) network throughput would have a different hardware type than a host having 64 CPU cores, 128 GB of memory, 16 GB/s network throughput, and an accelerator card. Thus, a fleet profile at some point in time might be 1,000 hardware type A (HW_TYPEA); 500 HW_TYPE_B, 800 HW_TYPE_C, and so on.

Templates link slots and hosts by grouping one or more slots together that "fit" within a given host. Each hardware type (and thus host) can have one or more templates pre-computed for it. For example, a template for the example host above with 64 CPU cores, 128 GB of memory, and 16 gigabits/second (Gb/s) network throughput could fit or "pack" thirty-two of the example virtual machine type with 2 vCPUs, 4 GB of memory, and 500 Mb/s of network throughput. Given that the resources offered by a given hardware type and the resource demands of the various virtual machine types are known, a set of all compatible templates can be calculated for a given hardware type, each template dividing up the resources of the host into one or more slots for one or more different virtual machine types.

Various exemplary fleet management operations to address short-term forecasted demand are described. Such operations can include generating and performing actions that change the fleet configuration to shift capacity between supplier and consumer pools. Various exemplary fleet management operations to address medium-term forecasted demand are described. Such operations can include generating an optimal packing solution for medium-term demand and influencing fleet configuration decisions toward that solution to increase the "free" capacity of the fleet in the medium-term and thereby increase fleet flexibility. Various exemplary fleet management operations to address long-term forecasted demand are described. Such operations can include identifying hardware types that provide high degrees of flexibility for long-term demand and deploying those hardware types to the fleet. Short-term forecasts typically relate to expected pool usage over the next hours to a day (e.g., 12 hours out), medium-term forecasts typically relate to expected pool usage over the next days to weeks (e.g., 10 days out), and long-term forecasts typically relate to expected pool usage over the next weeks to months (e.g., two months out). Other time horizons are possible.

FIG. 1 is a diagram illustrating a cloud provider network environment according to some examples. A cloud, such as cloud provider network 100, typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands (or to commands from internal cloud services or components). These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The computing-related capabilities provided by a cloud can be wide ranging. Such resources can include compute capabilities (e.g., executing virtual machines (VM) and/or containers, executing batch jobs, executing code without provisioning servers), data/storage capabilities (e.g., object storage, block-level storage, data archival storage, databases and database tables, etc.), network-related capabilities (e.g., configuring virtual networks including groups of compute resources, content delivery networks (CDNs), Domain Name Service (DNS)), application capabilities (e.g., databases, application build/deployment services), access policies or roles, identity policies or roles, machine images, routers and other data processing capabilities. These and other capabilities can be provided as services, such as a hardware virtualization service that can launch and execute compute resources, a storage service that can store data objects, etc.

The users (or "customers") of a cloud can use one or more user accounts that are associated with a customer account, though these terms can be used somewhat interchangeably depending upon the context of use. Users can interact with the cloud across one or more intermediate networks (e.g., the internet) via one or more interface(s), such as through use of application programming interface (API) calls, via a console implemented as a website or application, etc. The interface(s) can be part of, or serve as a front-end to, a control plane of the provider network 100 that includes "backend" services supporting and enabling the services that can be more directly offered to customers. In some contexts, users can include internal entities of the cloud such as operators or other systems or services, which may have access to additional, internal APIs.

An API refers to an interface and/or communication protocol between a client and a server, such that if the client makes a request in a predefined format, the client should receive a response in a specific format or initiate a defined action. In the cloud context, APIs provide a gateway for customers to access cloud infrastructure by allowing customers to obtain data from or cause actions within the cloud, enabling the development of applications that interact with resources and services hosted in the cloud. APIs can also enable different services or components of the cloud to exchange data with one another.

A cloud can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud via a publicly accessible network (e.g., the Internet, a cellular communication network), e.g., by way of a transit center (TC). TCs are the primary backbone locations linking users to the cloud and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide computing resource services such as those described above, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single host. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

The cloud provider network 100 includes various cloud management services 108 and fleet capacity 101. The cloud management services 108 include virtualization services 110 and fleet management services 150. Each of these services (and their components or sub-services) can be implemented as code (e.g., executable instructions, one or more computer programs, or one or more applications) executing on one or more processors. In some examples, the services may execute on hosts isolated from the fleet, on dedicated hosts within the fleet, or on shared hosts within the fleet. As indicated, virtualization services 110 place changing demands on the fleet as users launch and terminate virtual machines or applications or other managed services that execute using virtual machines. One such service is a hardware virtualization service. A hardware virtualization service (referred to in various implementations as an elastic compute service, a virtual machines service, a computing cloud service, a compute engine, or a cloud compute service) can enable users of the provider network 100 to provision and manage compute resources such as virtual machines.

Virtual machine technology can use one physical server to run the equivalent of many servers (each of which is called a virtual machine), for example using a hypervisor or other software application that manages the virtualization of the server's resources, which can run at least using the a portion of the same host resources being virtualized and/or on an offload card of the server (e.g., a card connected via PCI or PCIe to the physical CPUs). Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like).

As used herein, provisioning a virtual machine generally includes reserving resources (e.g., computational and memory resources) of an underlying host for the instance (e.g., from a pool of available physical compute instances and other resources), installing or launching required software (e.g., an operating system) to the instance, and making the instance available to the client for performing tasks specified by the client.

Fleet data 130 (which can be considered a form of metadata) includes data such as fleet profile data, fleet configuration data, and usage data. Fleet profile data can include, for example, an identification of each host (e.g., via a network address) and its associated hardware type, a total number of hosts of each hardware type, etc. Fleet configuration data can include, for example, which hosts are associated with which templates. Usage data can include, for example, which slots are used, free, reserved, or other status from both a fleet-wide perspective (e.g., 100 free slots for virtual machine type X, 200 used slots for virtual machine type X) and a host-level perspective (e.g., host 1234 has two virtual machine type X slots and two virtual machine type Y slots, one of the virtual machine type X slots is used).

While virtualization services 110 can affect fleet usage, the fleet management services 150 can "re-shape" the fleet to prepare the fleet for forecasted usage. At a high level, re-shaping operations entail shifting capacity between pools of capacity designated for different virtual machine types. Using the organizational structure described above, capacity pools (or just "pools") are the total number of slots of a particular virtual machine type created by a fleet configuration (e.g., templates associated with hosts). Slots can have varying states. In a simple case, slots can be either "used" or "free," although in other examples additional slot states may exist such as reserved, blocked or otherwise unavailable (e.g., due to unreliable operation, hardware failure, etc.), etc. Re-shaping operations can include changing the fleet configuration by changing host-to-template associations and/or migrating running virtual machine between hosts and changing the fleet profile by identifying and adding hosts of various hardware types to meet long-term demand, etc.

To illustrate, fleet capacity 101 shows, at an aggregate level, bars representing capacity pools 102 at two points in time (T1, at left; T2, at right), where the height of the bar representing the number of slots in the pool. Here, three pools exist for three virtual machine types, labelled A, B, and C. At time T1, the pools each have some amount of "used" capacity (diagonal hashing) and "free" capacity (no hashing). Fleet management services 150 can obtain forecasted demand data to determine whether any pools will be unable to meet demand, sometimes referred to as having a shortfall. The forecasted additional usage for each pool is illustrated in a bar next to each pool (square hashing). While pools B and C have sufficient free capacity to satisfy forecasted demand, pool A is in shortfall as the forecasted demand exceeds the total capacity (or the forecasted additional demand exceeds the free capacity). When pool(s) are in shortfall, fleet management services 150 perform various reshaping operations to eliminate the shortfall(s) or to fairly distribute the overall capacity shortfall amongst pools, as indicated. In this example, the fleet management services 150 reduce the capacity of pools B and C in order to increase pool A capacity.

Figure 2:
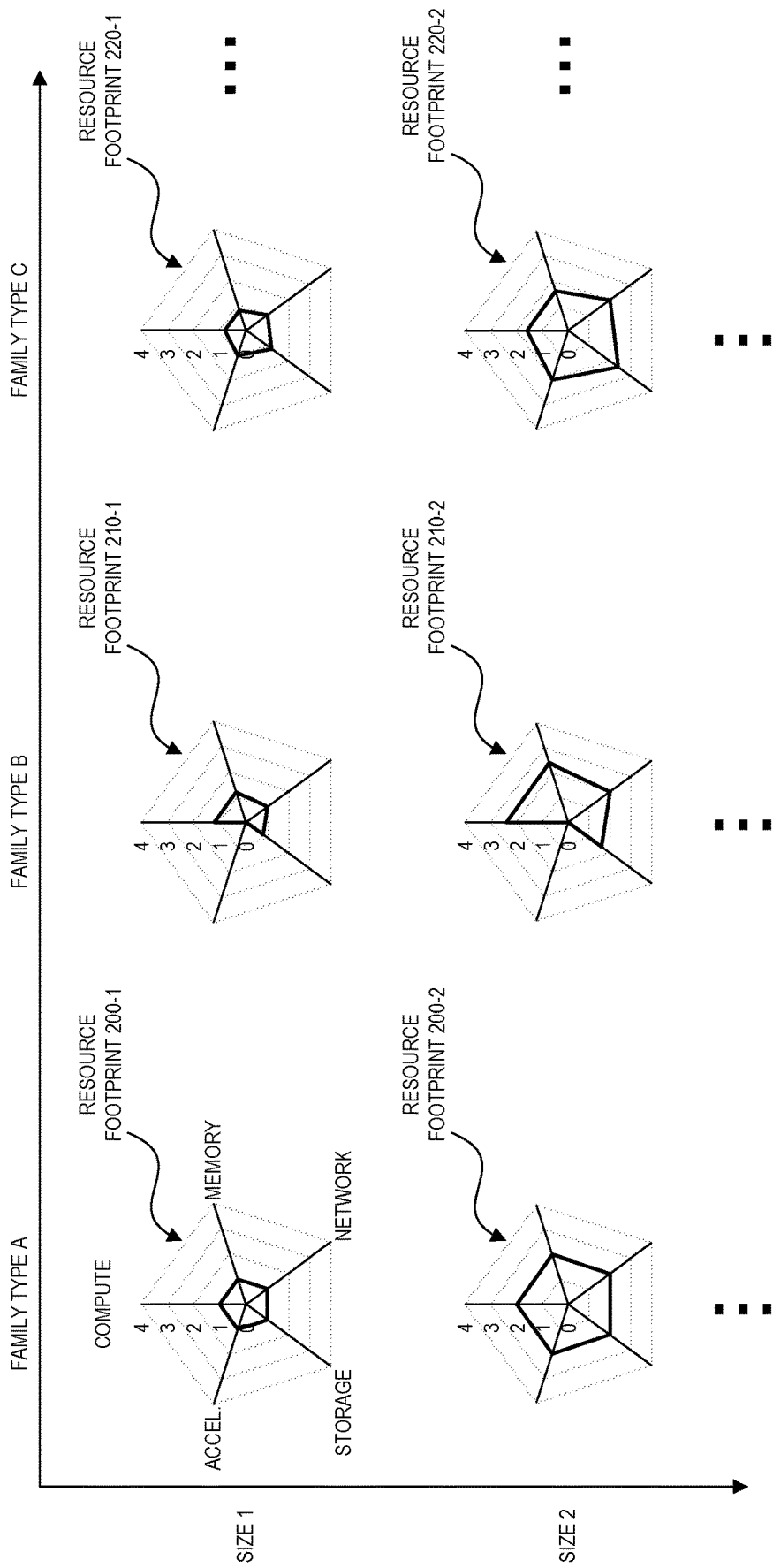
FIG. 2 is a diagram illustrating various virtual machine shapes according to some examples.
Figure 3:
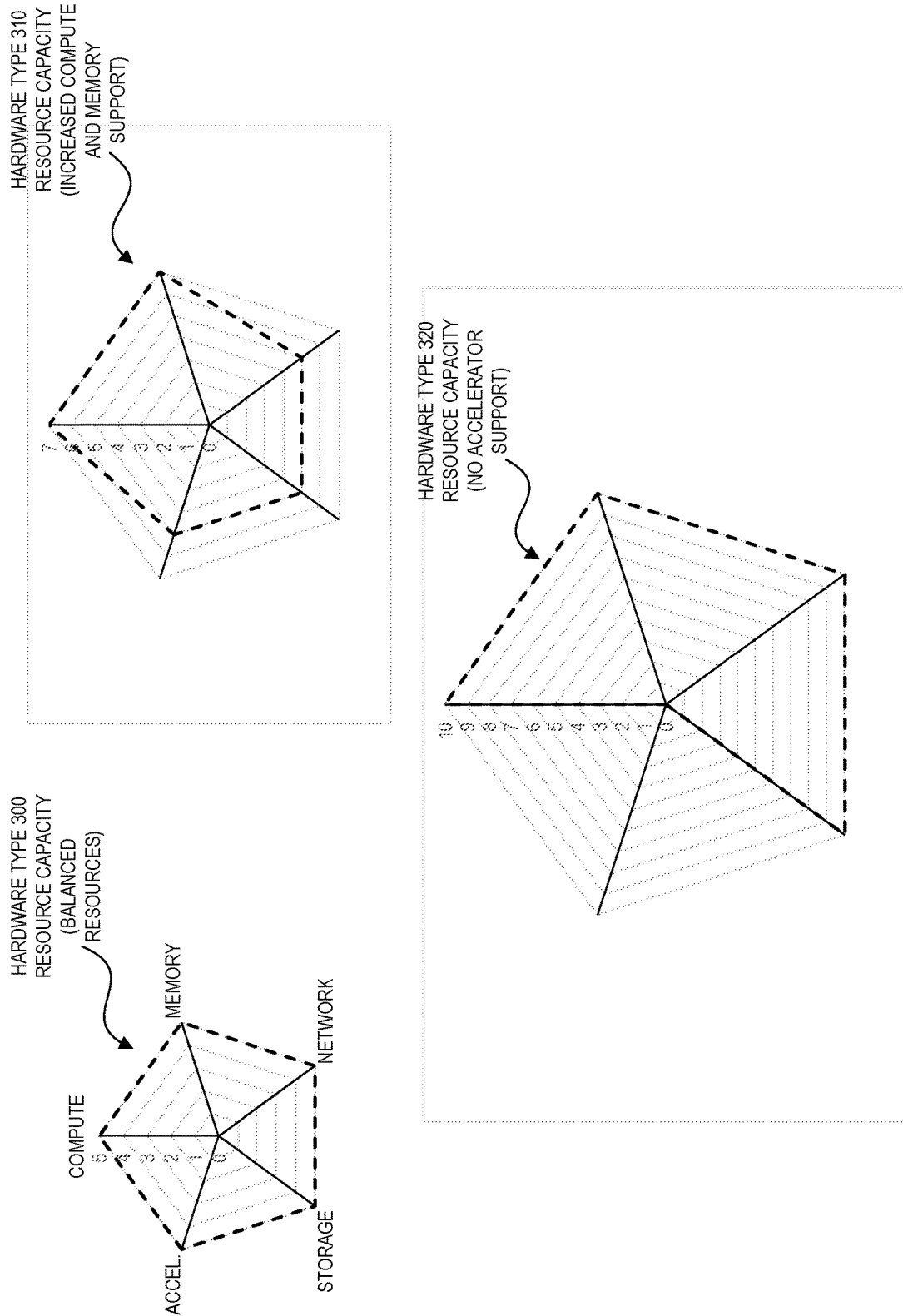
FIG. 3 is a diagram illustrating various host computer system shapes according to some examples.
Figure 4:
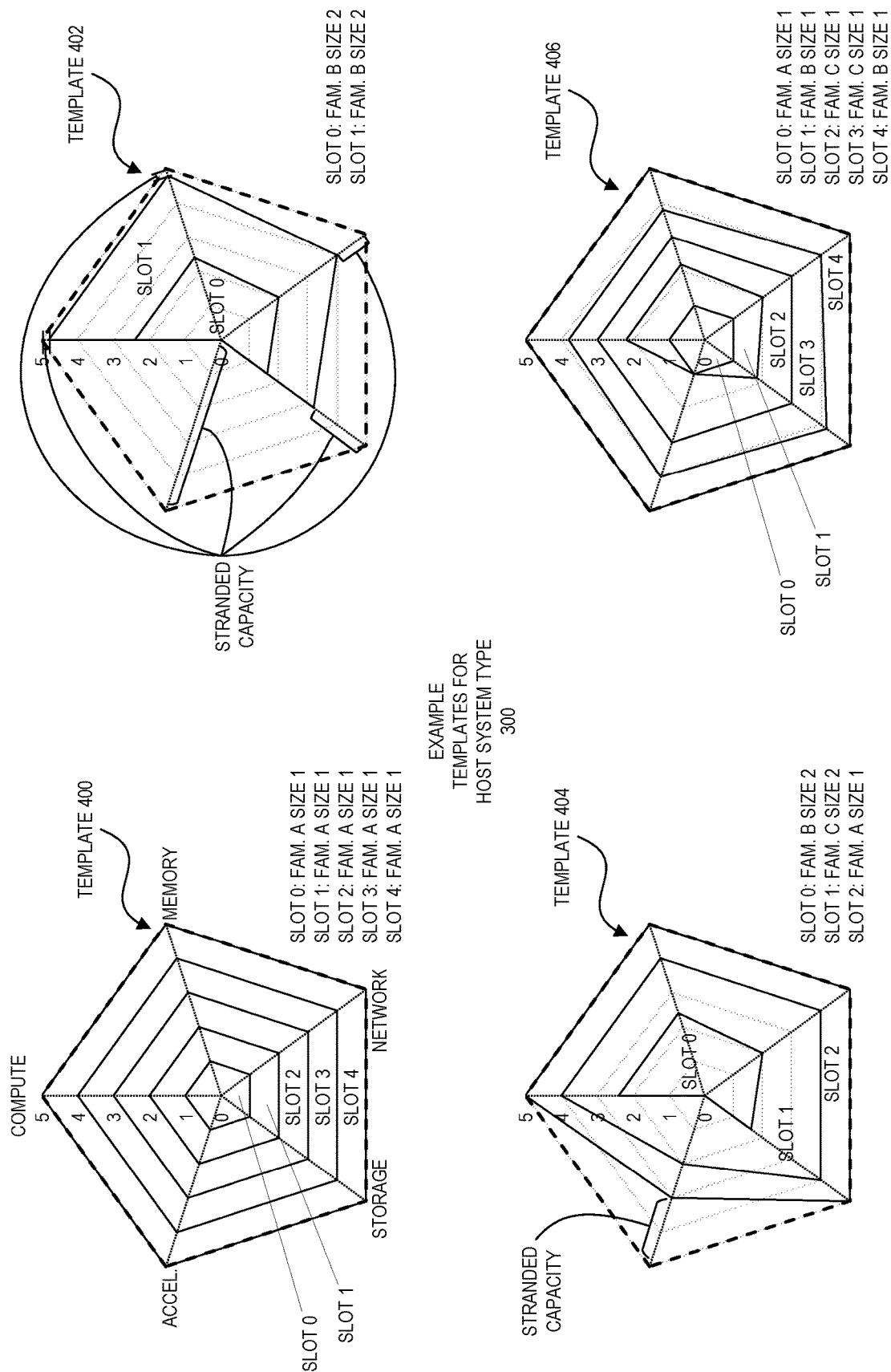
FIG. 4 is a diagram illustrating an example organization scheme for relating virtual machines and host computer systems according to some examples.

FIGS. 2-4 and their associated description provide additional detail on the example organizational structure of a cloud described above. The multi-dimensionality of resources creates complexity in the efficient packing of virtual machines onto hosts and the re-shaping of pools to adjust to shifting demand. As used herein, the term "shape" is variously used to describe the resource multi-dimensionality of a particular virtual machine type, a particular host computer system, or the amount of capacity allocated to different pools given a particular fleet configuration, depending on context.

FIG. 2 is a diagram illustrating various virtual machine shapes according to some examples. Some cloud providers may offer virtual machines in families having different sizes. Together, a particular family and size can create a virtual machine type. Different families can offer different resource profiles for different application requirements such as compute heavy workloads, memory heavy workloads, storage heavy workloads, accelerator-enabled workloads, etc. The different sizes within a family offer different levels of resource allocations.

Six radar plots graphically illustrate various virtual machine type shapes with solid lines. Each radar plot has five axes that, clockwise from top, represent compute, memory, network, storage, and accelerator capacity dimensions. In this manner, the footprint of a virtual machine shape can be visualized. Note that a different number of resource dimensions can exist (e.g., to account for more or fewer hardware components), and a different quantification of resource dimensions can exist (e.g., network storage capacity versus local storage capacity). The units used can be considered normalized to same base unit for each dimension but are not of significance.

Resource footprint 200-1 shows the shape of an instance type of family A size 1 having a balanced resource allocation profile (e.g., 1 unit of each of the resources). Resource footprint 200-2 shows the shape of an instance type of family A size 2 having a scaled up version of family A size 1.

Resource footprint 210-1 shows the shape of an instance type of family B size 1 having a resource allocation profile without an accelerator and relatively increased memory and compute allocations and a decreased storage allocation relative to family A. Resource footprint 210-2 shows the shape of an instance type of family B size 2 having a scaled up version of family B size 1.

Resource footprint 220-1 shows the shape of an instance type of family C size 1 having a resource allocation profile with relatively decreased memory and compute allocations and an increased storage allocation relative to family A. Resource footprint 220-2 shows the shape of an instance type of family C size 2 having a scaled up version of family C size 1.

While the illustrated size 2 footprints are scaled up relative to their size 1 counterparts by a factor of two for simplicity, the different sizes within a family need not have fixed resource allocation relationships. For example, the difference in a dimension from a small to medium size instance in a family may be proportionally different than the difference in that dimension from a medium to large size instance. Nor do resource dimensions need to scale up with increased size. A resource may be fixed across the family or scale up across tiers of sizes of the family. Lastly, the relative scaling of sizes within one family may be different to the relative scaling of sizes in another family.

In some examples, the shape of a virtual machine can be represented mathematically as a vector, with each entry in the vector representing some amount of a resource. For example, the following resource vectors represent the values used to generate the various virtual machine types in FIG. 2:

| VM Resource Vector | (compute, memory, network, storage, accelerator) | REF. |
|---|---|---|
| VM Fam. A Size 1 (200-1) | (1, 1, 1, 1, 1) | FAS1 |
| VM Fam. A Size 2 (200-2) | (2, 2, 2, 2, 2) | FAS2 |
| VM Fam. B Size 1 (210-1) | (1.2, 1.2, 1, 0.8, 0) | FBS1 |
| VM Fam. B Size 2 (210-2) | (2.4, 2.4, 2, 1.6, 0) | FBS2 |
| VM Fam. C Size 1 (220-1) | (0.8, 0.8, 1, 1.2, 1) | FCS1 |
| VM Fam. C Size 2 (210-2) | (1.6, 1.6, 2, 2.4, 2) | FCS2 |

Such resource vectors can be stored in a data structure such as a list, an array, a set of key-value pairs (e.g., compute=2), etc. Each virtual machine resource vector can have an identifier that various cloud management services 108 can use to reference it in fleet data 130.

FIG. 3 is a diagram illustrating various host computer system shapes according to some examples. Three radar plots graphically illustrate various host shapes with dashed lines. In contrast to the footprints of FIG. 2, the host shapes here represent the total resource capacity of a host of a particular hardware type. Again, each radar plot has five axes that, clockwise from top, represent compute, memory, network, storage, and accelerator capacity dimensions. As before, a different number of resource dimensions can exist, a different quantification of resource dimensions can exist, and the units used can be considered normalized to same base unit for each dimension but are not of significance.

Hardware type 300 resource capacity shows the shape of a host system with a relatively balanced resource capacity across all dimensions. Hardware type 310 resource capacity shows the shape of a host system with increased compute and memory capacity relative to hardware type 300. And hardware type 320 resource capacity shows the shape of a host system with significantly increased compute, memory, network, and storage capacity relative to hardware type 300 but without accelerator support.

Note that although the resource capacity of a dimension here is depicted as continuous, there may be underlying complexities that prevent arbitrary amounts of capacity from being allocated to instances. For example, the compute dimension may be discretized by CPU cores, memory may be discretized by pages, network and storage throughput by via time-based multiplexing of the communications channel (s) (assuming both are facilitated via networking), and so on. Other constraints can include those that arise from non-uniform memory architectures (NUMA) where certain processor cores may have reduced performance to certain memory blocks, limiting which portions of memory and compute capacity can be allocated together without sacrificing performance.

In some examples, the shape of a host can be represented mathematically as a vector, with each entry in the vector representing the maximum amount of a resource the host can provide for virtualization. For example, the following resource vectors represent the values used to generate the hardware types in FIG. 3:

| Hardware Type Resource Vector | (compute, memory, network, storage, accelerator, . . . ) |
|---|---|
| Hardware Type A (300) | (5, 5, 5, 5, 5) |
| Hardware Type B (310) | (7, 7, 5, 5, 5) |
| Hardware Type C (320) | (10, 10, 10, 10, 0) |

Such resource vectors can be stored in a data structure such as a list, an array, a set of key-value pairs (e.g., compute=64), etc. Each hardware type resource vector can have an identifier that various cloud management services 108 can use to reference it in fleet data 130.

FIG. 4 is a diagram illustrating an example organization scheme for relating virtual machines and host computer systems according to some examples. Templates divide the resources of a host amongst slots. Given the variety of hardware and instance types, each hardware type can and typically does have many different templates that "fit" it. Some templates might strand host capacity along one or more resource dimensions. Stranded capacity refers to capacity that is insufficient for slotting another instance type. While reducing stranded capacity can be beneficial if it leads to increased host utilization, increasing stranded capacity can also be desirable. For example, increasing stranded capacity can avoid capacity shortfalls for high-demand instance types without having to deploy additional hosts by re-slotting underutilized hosts with templates having additional slots for the high-demand instance types but with increased stranded capacity.

Example templates 400, 402, 404, and 406 are graphically depicted using the same style radar plots previously used to illustrate virtual machine and hardware shapes. Instance types (or their slots) are "packed" with the accumulated apportionment of host resources from each additional slot shown outward from zero up to and not exceeding the limits of the host hardware type. Example templates 400, 402, 404, and 406 draw from the example virtual machine types illustrated in FIG. 2 as applied to the example hardware type 300 of FIG. 3.

Template 400 packs five family A size 1 slots and is sometimes referred to as a homogenous template since all slots are of the same type. Template 402 packs two family B size 2 slots and has stranded capacity on all five dimensions (with no accelerator usage at all). Template 404 packs one family B size 2 slot, one family C size 2 slot, and one family A size 1 slot. Template 406 packs one family A size 1 slot, two family B size 1 slots, and two family C size 1 slots. These latter three templates are sometimes called heterogenous templates since they pack slots for instances of different types.

A template can be stored as a data structure such as a list, array, or set of resource vectors. For example, the following data structures can represent the templates illustrated in FIG. 4:

| Host System Type 300 Template | ( . . . ) |
|---|---|
| Template A (400) | (FAS1, FAS1, FAS1, FAS1, FAS1) |
| Template B (402) | (FBS2, FBS2) |
| Template C (404) | FBS2, FCS2, FAS1) |
| Template D (406) | (FAS1, FBS1, FCS1, FCS1, FBS1) |

Each template can have an identifier that various cloud management services 108 can use to reference it in fleet data 130.

As indicated above, templates can be pre-computed for a given hardware type (e.g., by a template service, outside of the scope of the present disclosure) given a set of constraints such as the hardware complexities described above and software limitations, if any. Such software constraints can include certain compatibility restrictions preventing certain virtual machine types from being hosted together (e.g., a particular instance type consumes all of a particular resource), certain software limitations (e.g., Linux versus Windows), certain networking limitations (e.g., network address translation (NAT)-enabled, no-NAT), etc.

Templates 400, 402, 404, and 406 are obviously not an exhaustive set of templates that can be created for the example virtual machine types illustrated in FIG. 2 as applied to the example host system type 300 of FIG. 3, but together they illustrate the complexity faced by cloud provider fleet management operations-shaping fleet capacity for many pools across many systems quickly becomes challenging.

Given the complexity of fleet management operations, examples disclosed herein use optimizer applications for various fleet management tasks. At a high level, an optimizer application or "optimizer," for short, attempts to optimize some objective function given a set of constraints. Optimizers can solve many mathematical problems, such as systems of linear or non-linear equations with real, integer, or mixed-type variables. At a basic level, an optimizer can evaluate each candidate in a solution space to determine whether, given the objective and constraints, it is the "best" candidate (and thus the solution). Since such a brute-force approach can be computationally expensive, especially for large solution spaces, optimizers often rely on mathematical techniques to reduce the solution space without performing an exhaustive enumeration of all possible solutions. One such optimizer is FICO Xpress.

Figure 5:
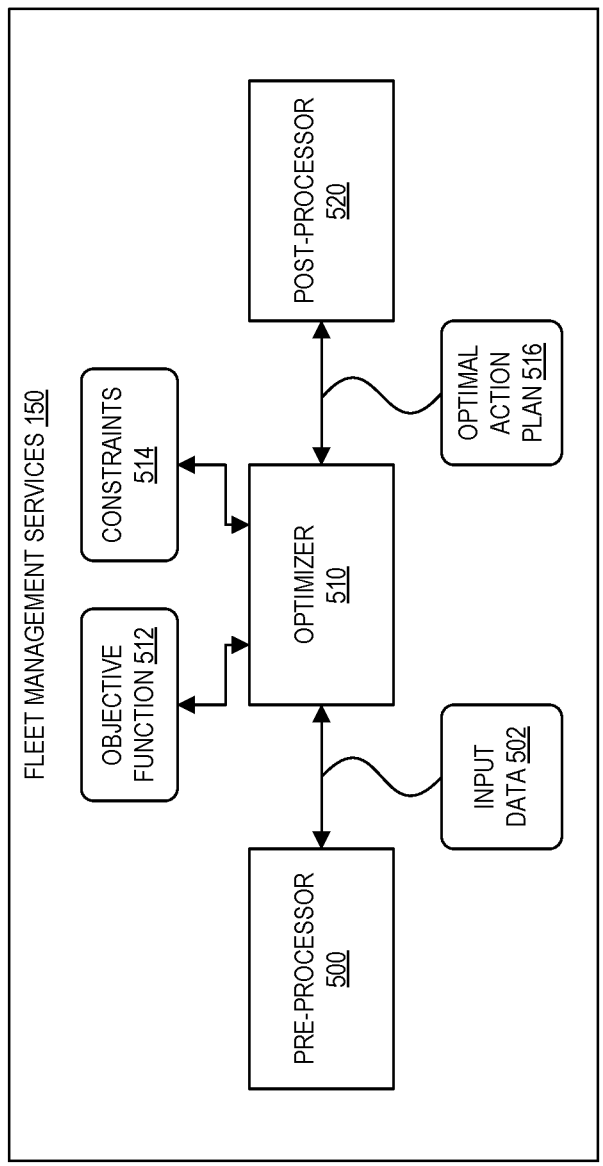
FIG. 5 is a diagram illustrating fleet management components of a cloud provider network to change a fleet configuration according to some examples.

FIG. 5 is a diagram illustrating fleet management components of a cloud provider network to change a fleet configuration according to some examples. As illustrated, fleet management services 150 include a pre-processor 500, an optimizer 510, and a post-processor 520. Each of these components can be implemented as code (e.g., executable instructions, one or more computer programs, or one or more applications) executing on one or more processors. The pre-processor 500 collects data from various sources to prepare input data 502 for the optimizer 510. Additional details related to exemplary pre-processor operations are provided with reference to FIG. 6.

The post-processor 520 receives an optimal action plan 516 from the optimizer 520. An exemplary action plan includes one or more actions to perform to change the fleet configuration. Exemplary actions include migrating virtual machines from a slot on one host to a slot on another host and re-slotting a host by changing its associated template. While migration and re-slotting are focused on in the remainder of this disclosure, many other actions may be possible. For example, a host re-build action may involve reprogramming and/or changing the physical configuration of the host to allow it to support different type virtual machines. As another example, an eviction action may pause and store a virtual machine to be later resumed when demand has waned. Additional details related to exemplary post-processor operations are provided with reference to FIG. 7.

In addition to the input data 502, the optimizer 510 receives (or is otherwise configured with) an objective function 512 and constraints 514, if any, which together form a model. Here, the optimizer 510 solves for a set of actions to re-shape a balancing unit by re-assigning resources associated with slots in oversupplied (donor) pools to slots in undersupplied (consumer) pools such that the total shortfall in the consumer pools is minimized given minimum desired free slot levels derived from the short-term forecasted demand for all capacity pools in a balancing unit. A balancing unit ("BU") refers to a set of hosts and a set of virtual machine types that those hosts can support. Oversupplied pools have slots above healthy or minimum desired levels, while undersupplied pools have slots below minimum desired levels.

An exemplary mathematical optimization model that includes an objective function 512 in equation (1) and a set of constraints 514 in equations (2)-(7) follows. The "total shortfall" in the example model is the sum of the piecewise-linear and convex shortfall penalty functions across all consumer pools in the balancing unit. Other objective functions can be used, such as a non-linear quadratic objective function. Additionally, the model can be extended to handle secondary objectives, such as evictions of running instances, minimizing long re-build actions, etc. The contribution of each potential action on a given droplet to the primary as well as the secondary objectives can be computed a priori. Therefore, while the example model above focuses on a primary objective of remediating shortfalls in consumer pools, a model can be extended to cover additional objectives.

Parameters:
H: set of hosts in the BU
|H|: number of hosts in the BU
P: set of capacity pools in the BU, where
$f^p$: current number of free slots in the pool $p \in P$
$\overline{l}^p$: free slot level for pool $p \in P$, above which the pool is considered healthy
$\underline{l}^p$: minimum desired free slot level for pool $p \in P$, where $\underline{l}^p \leq \overline{l}^p$
$P_c$: set of capacity pools in the BU which are consumers (e.g., current free slots below $\underline{l}^p$)
$P_d$: set of capacity pools in the BU which are donors (e.g., current free slots above $\overline{l}^p$)
$P_n$: set of capacity pools in the BU which are neutral (e.g., current free slots are between $\underline{l}^p$ and $\overline{l}^p$ if $\underline{l}^p$ is strictly less than $\overline{l}^p$. $P_n = \emptyset$ if $\underline{l}^p = \overline{l}^p$
$P = P_c \cup P_d \cup P_n$ $$\Delta^p = \begin{Bmatrix} \overline{l}^p - f^p < 0, & p \in P_d \\ \underline{l}^p - f^p > 0, & p \in P_c \\ 0, & p \in P_n \end{Bmatrix}, \text{ where for a consumer pool } p \in P_c, \Delta^p \text{ represents the shortfall}$$

to $\underline{l}^p$, but for a donor pool $p \in P_d$, $\Delta^p$ represents the number of slots that can be given away
$n_s^p$: number of disjoint ranges for a shortfall in consumer pool $p \in P_c$. In range 1 to $n_s^p$, the shortfall after balancing is smallest to largest, respectively.
$w_k^p$: width of the shortfall range k for pull p (e.g., the shortfall assigned to range k cannot exceed $w_k^p$)
$c_k^p$: penalty for one slot of shortfall in range k for consumer pool $p \in P_c$. The weights $c_k^p$ are exponentially increasing over $k = 1, \ldots, n_s^p$ to disfavor few, large shortfalls over many, small ones
$\delta^p$: normalization factor for pool p so that shortfalls across pools can be compared
$A_h$: set of all potential actions compatible with the current state of the host $h \in H$
$a_h^p$: number of slots created or removed for pool p by performing action $a \in A_h$
$\overline{A}$: upper bound no large than |H| on the number of actions that can be taken across the BU in the current run
Variables:

$$x_{h,a} = \begin{Bmatrix} 1, & \text{if action } a \in A_h \text{ is selected for host } h \\ 0, & \text{otherwise} \end{Bmatrix}$$

$s_k^p$: number of slots of shortfall in range k in consumer pool $p \in P_c$
Objective Function:

$$\text{minimize} \sum_{p \in P_c} \sum_{k=1}^{n_p^s} c_k^p \delta^p s_k^p \quad (1)$$

Constraints:

$$\sum_{h \in H} \sum_{a \in A_h} a_h^p x_{h,a} + \sum_{k=1}^{n_s^p} s_k^p \geq \Delta^p \quad p \in P_c \quad (2)$$

$$\sum_{h \in H} \sum_{a \in A_h} a_h^p x_{h,a} \geq \Delta^p \quad p \in P_d \cup P_n \quad (3)$$

$$\sum_{a \in A_h} x_{h,a} \leq 1 \quad h \in H \quad (4)$$

$$\sum_{h \in H} \sum_{a \in A_h} x_{h,a} \leq \overline{A} \quad (5)$$

$$x_{h,a} \in \{0, 1\} \quad h \in H, a \in A_h \quad (6)$$

$$0 \leq s_k^p \leq w_k^p \quad p \in P_c, k = 1, \ldots, n_s^p \quad (7)$$

In the above example model, the objective function equation (1) minimizes the total normalized shortfall across all consumer pools $p \in P_c$ with respect to their minimum desired free slot levels $\underline{l}^p$. Constraint equation (2) calculates how much net capacity is moved into consumer pools by the actions taken across all hosts in the BU and sets the shortfall quantities in all shortfall ranges when the minimum desired free slot levels cannot be met by the available actions. The model computes the total shortfall in pool $$p \in P_c \text{ as } \sum_{k=1}^{n_s^p} s_k^p,$$

and the structure of the objective function weights discussed above ensures that $s_{k+1}^p = 0$ unless $s_k^p = w_k^p$ for $k = 1, \ldots, n_s^p - 1$. Thus, the overall shortfall penalty for each pool $p \in P_c$ has a piecewise-linear and convex cost structure. Note that the maximum width of each shortfall range is specified in constraint equation (7). Similarly, constraint equation (3) determines how much net capacity is moved out of donor and neutral pools by the actions taken across all hosts in the BU. No shortfall variables are present in these constraints as there are hard limits on how many slots can be moved out of donor and neutral pools. Constraint equation (4) limits the number of actions for a single host to one. Constraint equation (5) limits the total number of actions in the BU based on the run to a threshold $\overline{A}$ smaller than $|H| \cdot x_{h,a}$ in the solution represents the action plan.

If unable to meet forecast targets, the optimizer 510 minimizes the total shortfall below the short-term pool targets spread relatively equally across the pools.

The following is an example of the data that can be contained or otherwise represented in an exemplary optimal action plan.

| Host | Action |
|---|---|
| HOST_ID_A | RE-SLOT: TEMPLATE_X |
| HOST_ID_B | MIGRATE: SLOT_0; RE-SLOT: TEMPLATE_Y |

Balancing units are one way of reducing the solution space for an optimizer, typically reducing the optimizer's resource usage and/or runtime. At one extreme, a balancing unit may be all of the hosts in a cloud and all of the instance types. Smaller balancing units can be circumscribed based on one or more factors. For example, a fleet may naturally partition into balancing units based on regions or zones. As another example, the fleet (or a region or zone thereof) can be partitioned into a set of hardware types and an affiliated set of virtual machine types based upon available resource (e.g., those without accelerator support, those with particular accelerator support, those without local storage support, etc.). In some cases, the set of hardware types and the set of virtual machine types in a balancing unit are mutually exclusive with other balancing units. For example, one balancing unit might have hardware types A, B, and C and virtual machine types Q, R, and S, while another balancing unit might have hardware types D, E, and F and virtual machine types T, U, and V.

In some examples, either the pre-processor 500 or the optimizer 510 includes a timer to periodically initiate an optimization pass. For example, the pre-processor can initiate a pass approximately every 10 minutes days and send new input data 502 to the optimizer 510 via an API call. Conversely, the optimizer 510 can initiate a pass by requesting the input data 502 from the pre-processor 500 via an API call. Performing frequent passes allows the fleet management services 150 to adjust to rapid and/or unexpected changes in the fleet state and/or forecasted demand.

Figure 6:
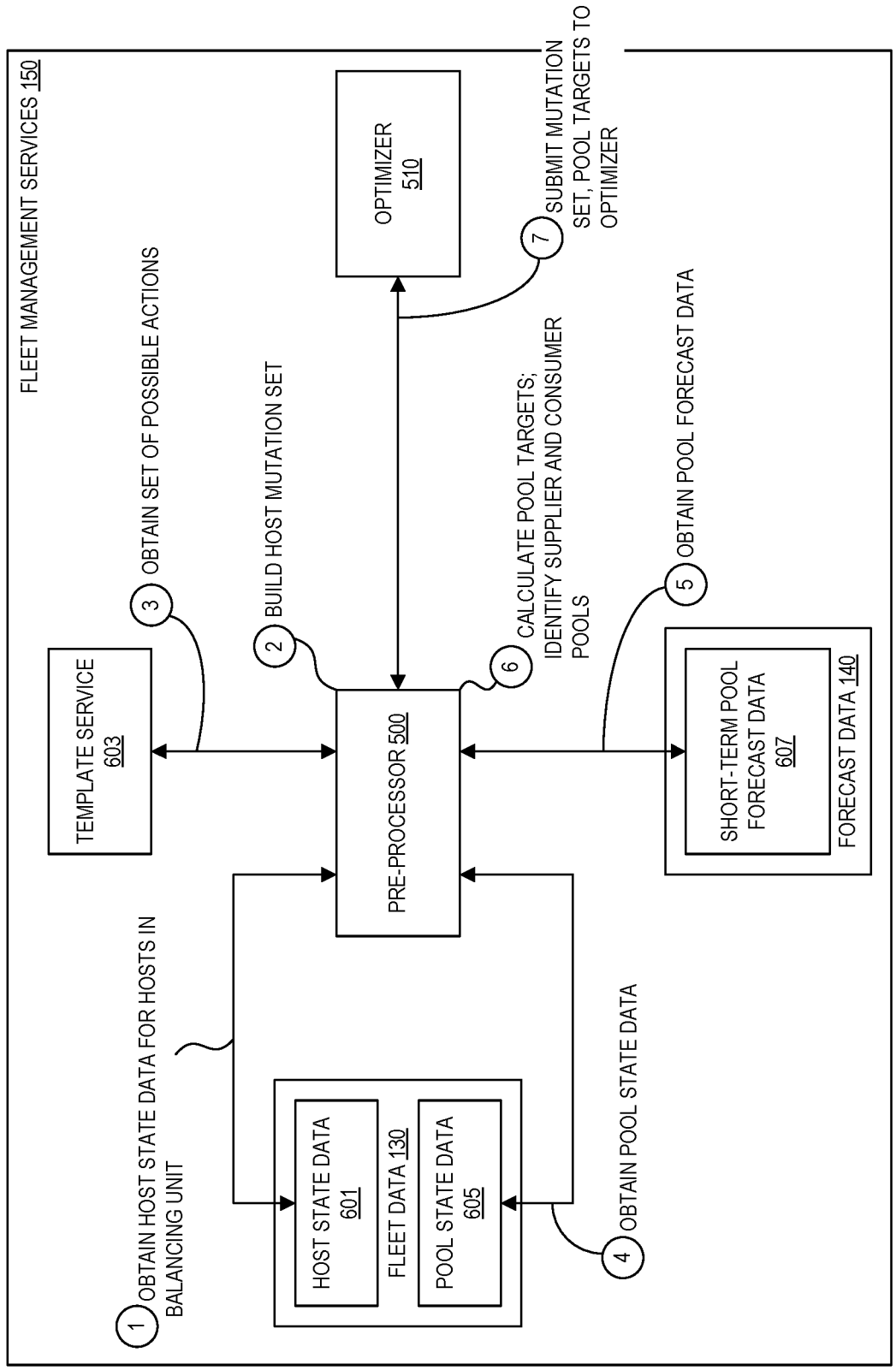
FIG. 6 is a diagram illustrating the pre-processor of FIG. 5 in greater detail according to some examples.

FIG. 6 is a diagram illustrating the pre-processor of FIG. 5 in greater detail according to some examples. The exemplary operations of the pre-processor 500 are described with reference to the circled numbers. As indicated at circle 1, the pre-processor 500 obtains state data for the hosts in the balancing unit from the host state data 601 in the fleet data 130. Exemplary state data includes, for each host identifier, the associated hardware type, template, and slot status data (indicating the state of each slot).

As indicated at circle 2, the pre-processor 500 generates a host mutation set. In its base form, a host mutation set includes an entry for each host, each entry including a host identifier and a set of zero or more actions that are permissible on that host given its current state. Hosts with zero possible actions can be omitted. As part of generating a host mutation set, the pre-processor 500 fetches a set of possible actions for a given entry from a template service 603 as indicated at circle 3.

One optimization to reduce the complexity of the optimization problem involves the creation of host equivalence groups (HEGs). A host equivalence group is effectively an aggregation of all hosts in the same state into a single entry in the mutation set. For example, hosts with the same hardware type, template, and slot status can be consolidated as the set of permissible actions for those hosts would be identical. An entry in the host mutation set for a HEG can include a set of host identifier in that HEG.

The following is an example of the data that can be contained or otherwise represented in an exemplary host mutation set. In the first entry, a single host having identifier HOST_ID_A has two possible actions: re-slotting to template X or Y. In the second entry, a HEG has three possible actions: re-slot to template Z, migrate the instance in slot 0 and re-slot to template AA, or migrate the instance in slot 0 and re-slot to template AB. Note that without HEGs, the second entry would be split into three entries—one for HOST_ID_B, one for HOST_ID_C, and one for HOST_ID_D—with identical action sets.

| | |
|---|---|
| HOST_ID_A | (Template_X, Template_Y) |
| (HOST_ID_B, HOST_ID_C, HOST_ID_D) | (Template_Z, Migrate_Slot_0(TemplateAA, TemplateAB) |

Another optimization to reduce the complexity of the optimization problem involves the removal of certain hosts from host mutation set based on one or more thresholds. For example, if the resources allocated to host slots exceed some threshold of the total amount of resources of the those, the pre-processor 500 can omit the host from the host mutation set.

The template service 603, typically part of fleet management services 150, may be the template service used to pre-compute valid templates for a given host, or another service. The template service 603 includes an API through which requests that include a host hardware type identifier, current template, and slot status can be submitted to retrieve a set of actions that can be performed on the host given its current state. Using an empty host (no slots used) as an example, the template service 603 can return a candidate set of actions that include re-slotting the host (changing the associated template) to all valid templates (or all valid templates less the current template) that are valid for the hardware type.

In some examples, the template service 603 can return a set of actions that contemplates migrations of virtual machines in used slots (e.g., if migrate slot 1: {set of valid templates}; if migrate slot 2: {set of valid templates}; if migrate slots 1 and 2: {set of valid templates} . . . ). In other examples, the pre-processor 500 can submit a series of requests to the template service with modified slot status data to obtain a set of valid actions given hypothetical migrations.

In some examples, the pre-processor 500 can limit the number of migrations contemplated by actions in the set to be below some threshold.

As indicated at circle 4, the pre-processor 500 obtains pool-level data for the pools in the balancing unit from the pool state data 605 in the fleet data 130. Exemplary pool-level data includes, for each pool, the number of free slots, the number of used slots, and the number of in-progress slots that will be added or removed due to in-flight operations (e.g., incomplete operations from a prior action plan).

As indicated at circle 5, the pre-processor 500 obtains short-term pool forecast data 140 for the pools in the balancing unit from the forecast data 140. In some examples, forecast data 140 is indexed pool and future time, such as in a database. The pre-processor 500 can query the forecast data for the pools in the balancing unit at a time such as 12 hours from the query time.

As indicated at circle 6, the pre-processor 500 can calculate individual pool targets by subtracting the sum of free and in-progress slots from the pool forecast (assuming pool forecast data represents the total number of slots expected to be used). For example, if, for a given pool, there are 50 free slots, 3 in-progress slots, and the pool forecast is 100, the pool target would be 47. As another example, if, for another pool, there are 100 free slots, −10 in-progress slots, and the pool forecast is 50, the pool target would be −40.

In some examples, the pre-processor 500 can provide an identification of the set of pools that are suppliers and of the set of pools that are consumers. Using the above example target calculation, pools with a negative target can serve as supplier pools and pools with a positive target are consumer pools. Pools with a zero target can be considered neutral pools.

As indicated at circle 7, the pre-processor 500 sends the host mutation set and pool target data to the optimizer 510.

Figure 7:
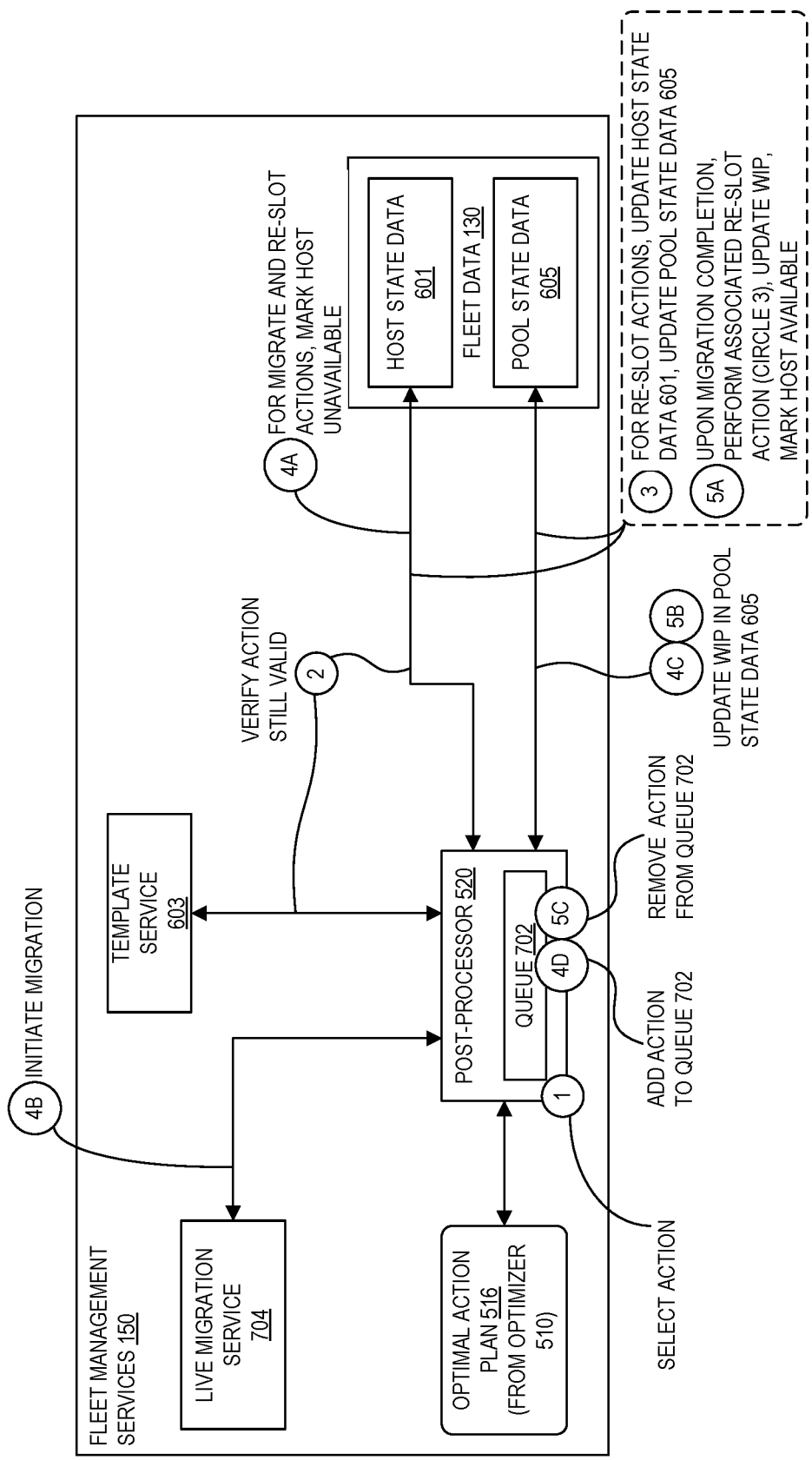
FIG. 7 is a diagram illustrating the post-processor of FIG. 5 in greater detail according to some examples.

FIG. 7 is a diagram illustrating the post-processor of FIG. 5 in greater detail according to some examples. The exemplary operations of the post-processor 520 are described with reference to the circled numbers. As indicated at circle 1, the post-processor 520 selects a next action from action plan. The handling of the action plan can vary depending on whether HEGs are used. To illustrate, the following is an example of the data that can be contained or otherwise represented in an exemplary optimal action plan that includes HEGs.

| Host/HEG | Action/Set of (Action, Qty) for HEGs |
| --- | --- |
| HOST_ID_A | RE-SLOT: TEMPLATE_X |
| (HOST_ID_B, HOST_ID_C, HOST_ID_D, HOST_ID_E) | (MIGRATE: SLOT_0, RE-SLOT: TEMPLATE_Y; QTY = 1) (RE-SLOT: TEMPLATE_Y, QTY = 2) |

In the case of a non-HEG such as the first entry in the above data, the post-processor 520 can select the action (re-slot the host with HOST_ID_A to TEMPLATE_X. In the case of a HEG such as the second entry in the above data, the post-processor 520 can select one of the hosts in the HEG and one of the remaining actions in the action set for the HEG. After completing the action, the post-processor 520 can decrement the quantity of the selected action in the set of actions and remove the identification of the host from the HEG. The post-processor 520 can continue performing actions on the HEG until the identification of hosts in the HEG is exhausted. Note that the total number of actions in an action set for an HEG is less than or equal to the number of hosts in the HEG, provided the total number of actions in the action plan is constrained by the number of hosts in the balancing unit.

As indicated at circle 2, the post-processor 520 can verify the selected action is still valid. Such verification may be appropriate if the state of the host may have changed since it was captured (e.g., at circle 1 of FIG. 6). For example, if a new virtual was launched on the host, an action to change the template of the host to another template that does not include a slot for that newly launched virtual machine would be invalid. To verify whether the action remains valid, the post-processor can obtain the hardware type and slot status of the selected host from the host state data 601 in fleet data 130, and submit a request to the template service 603 with the hardware type and slot status data to verify the selected action is permitted or to retrieve the set of permissible actions and then check whether the selected action is within the set.

As indicated at circle 3, if the selected action is a re-slot operation that changes the template associated with the host, the post-processor 520 can update host state data 601 to associate the new template with the host and update the pool state data 605 to reflect slot deltas that occur from re-slotting (new template association). For example, if the old template had three slots for virtual machine type A and the new template has two slots for virtual machine type B and one slot for virtual machine type A, the post-processor 520 would increase the number of free slots for the pool of virtual machine type B by two and decrease the number of free slots for the pool of virtual machine type A by one.

As indicated at circle 4A, if the selected action involves a migration operation, the post-processor 520 can update host state data 601 to update the state of the host to prevent changes to associated slot statuses so that the re-slot operation does not become stale during the migration time. For example, host state data 601 can include a status of the host, and the post-processor 520 can update that host status to indicate the host is unavailable.

As indicated at circle 4B, the post-processor 520 submits a request to a live migration service 704 to initiate the migration of the virtual machine in the slot identified in the action. Live migration refers to the process of moving a running virtual machine between different physical machines without significantly disrupting the availability of the virtual machine (e.g., the down time of the virtual machine is not noticeable by the end user). The live migration service 704 manages the live migration of virtual machines from a "source" host to a different "destination" host. After identifying a candidate destination host, the live migration service 704 can then cause the state (e.g., vCPU registers, memory, storage data, network connectivity, etc.) of the virtual machine in an "active" domain to be captured on the source host, transferred to the destination host, and loaded into the corresponding state data for the virtual machine in an "inactive" domain on the destination host system. For example, a local migration manager running on the source host can send memory pages to the target host (also referred to as the "state" of the virtual machine), track changes to the memory pages, and continue sending the changed pages to the target host. The virtual machine may be briefly paused to prevent state changes while transferring a final set of memory contents to the target host. Thereafter, one or more of a control plane component, the local migration manager, and the hypervisors (on the source and target hosts) can transition the inactive domain to become the active domain and demote the original active domain to become the inactive domain (sometimes referred to as a "flip"), after which the virtual machine begins running on the target host, and the inactive domain can be discarded.

As indicated at circle 4C, the post-processor 520 can update the number of in-progress slots for the affected pools in pool state data 605 to reflect slot deltas that will occur from re-slotting. Using the same example, if the old template had three slots for virtual machine type A and the new template will have two slots for virtual machine type B and one slot for virtual machine type A, the post-processor 520 would increase the number of in-progress slots for the pool of virtual machine type B by two and decrease the number of in-progress slots for the pool of virtual machine type A by one.

As indicated at circle 4D, the post-processor 520 can add the action to a queue 702 to track the action while the live migration process is pending.

As indicated at circle 5A, once the post-processor 520 receives an indication from the live migration service 704 that the migration is complete, the post-processor 520 can perform the operations described above at circle 3 (e.g., re-slot the host with the template identified in the action, update the number of free slots in the affected pools). The post-processor 520 also can revert the changes it made to the number of in-progress slots in the affected pools previously made at circle 4C and can update the host status to revert the change made at circle 4A, if applicable.

As indicated at circle 5B, the post-processor 520 can remove the action from the queue 702.

In some cases, the post-processor 520 may not begin all of the operations in a prior action plan 516 before the optimizer 510 completes another pass and sends a new action plan 516. In some examples, the post-processor 520 can clear the remaining actions or otherwise delete the prior action plan upon receipt of a new action plan 516.

Figure 8:
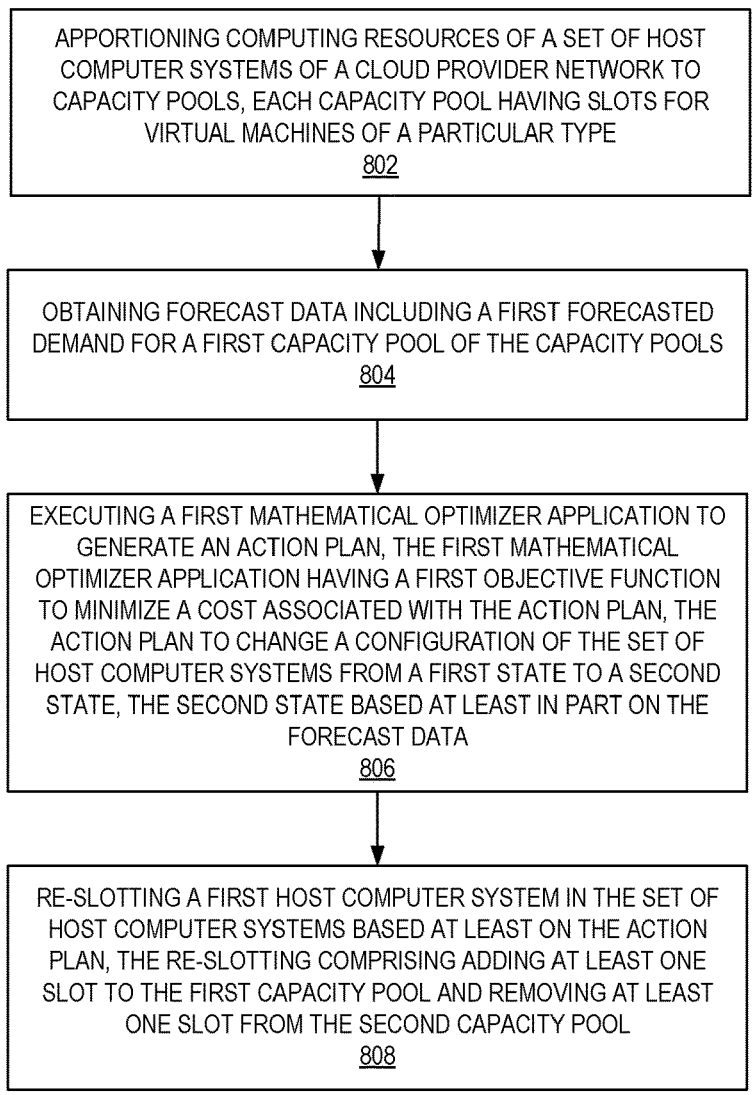
FIG. 8 is a flow diagram illustrating operations of a method for changing a fleet configuration according to some examples.

FIG. 8 is a flow diagram illustrating operations of a method 800 for changing a fleet configuration according to some examples. Some or all of the operations 800 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 800 are performed by the fleet management services of the other figures.

The operations 800 include, at block 802, apportioning computing resources of a set of host computer systems of a cloud provider network to capacity pools, each capacity pool having slots for virtual machines of a particular type. For example, the associations of templates to host computer systems can divvy up the host computer systems into capacity pools. The operations 800 further include, at block 804, obtaining first forecast data including a first forecasted demand for a first capacity pool of the capacity pools. The operations 800 further include, at block 806, executing a first mathematical optimizer application to generate an action plan, the first mathematical optimizer application having a first objective function to minimize a cost associated with the action plan, the action plan to change a configuration of the set of host computer systems from a first state to a second state, the second state based at least in part on the first forecast data. The operations 800 further include, at block 808, re-slotting a first host computer system in the set of host computer systems based at least on the action plan, the re-slotting comprising adding at least one slot to the first capacity pool and removing at least one slot from the second capacity pool.

Figure 9:
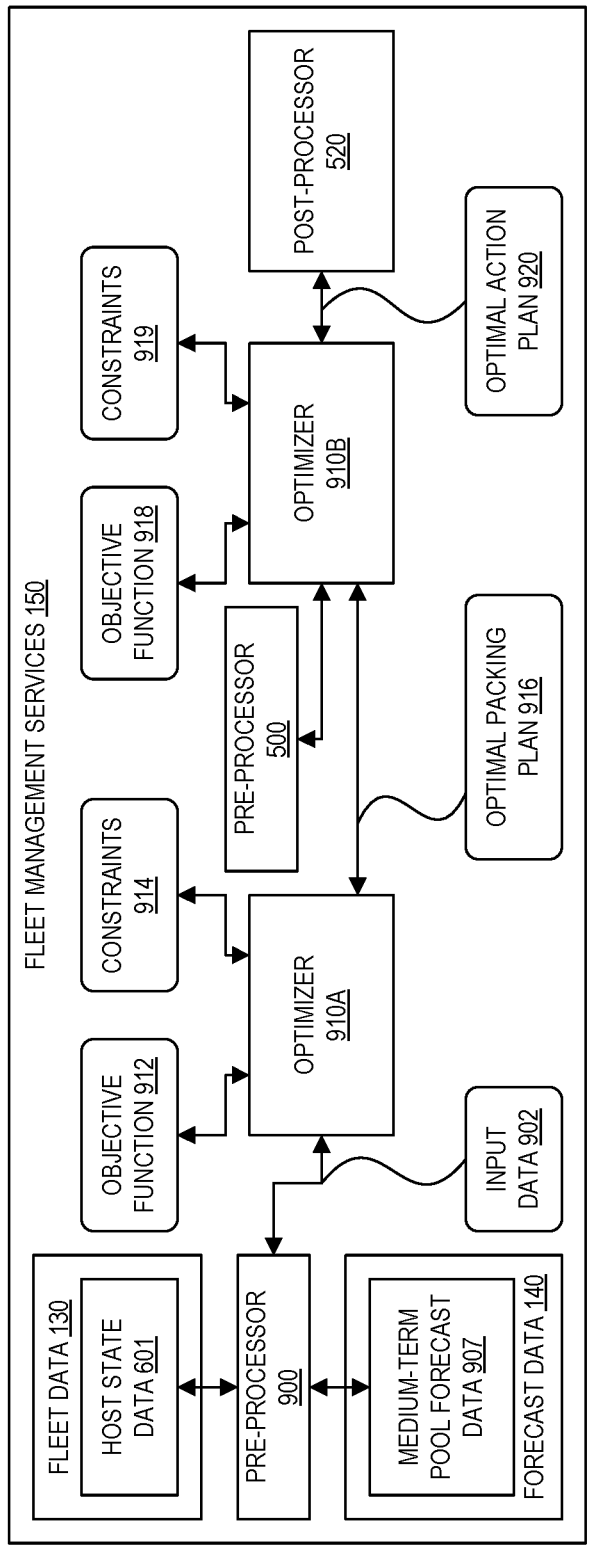
FIG. 9 is a diagram illustrating fleet management components of a cloud provider network to improve fleet packing according to some examples.

FIG. 9 is a diagram illustrating fleet management components of a cloud provider network to improve fleet packing according to some examples. As illustrated, fleet management services 150 include a pre-processor 900, an optimizer 910A, an optimizer 910B, and the previously described pre-processor 500 and post-processor 520. Each of these components can be implemented as code (e.g., executable instructions, one or more computer programs, or one or more applications) executing on one or more processors.

In this staged optimizer configuration, optimizer 910A generates an optimal packing plan 916 that is used by the optimizer 910B to generate an optimal action plan 920. The optimal packing plan is based at least in part on medium-term forecast data (or forecast data at a time horizon further out than the forecast data used by optimizer 510) and the current fleet profile (e.g., number of hosts of each type) independent of the fleet configuration (which hosts are associated with which templates, which slots are used, etc.). The optimizer 910B uses the optimal packing plan 916 to bias its optimal action plan 920 towards that "ideal" state, ultimately increasing the "free" capacity of the fleet in the medium-term and thereby increasing fleet flexibility.

The pre-processor 900 collects data from various sources to prepare input data 902 for the optimizer 910A. One such input data 902 item is the total number of hosts of each hardware type in the balancing unit (e.g., $n_h$ in the below parameters), which may be maintained in fleet data 130 and available to the pre-processor 900. In other examples, the pre-processor 900 determines the total number of hosts of each hardware type in the balancing unit from the host state data 601 by obtaining, for each host identifier in the balancing unit, the associated hardware type and calculating the total number of hosts of each hardware type. Another input data 902 item is medium-term pool forecast data 907 for the pools in the balancing unit (e.g., di in the below parameters) from the forecast data 140. An exemplary medium-term forecast horizon is 10 days in the future. The pre-processor can send the input data 902 to the optimizer 910A.

In some examples, either the pre-processor 900 or the optimizer 910A includes a timer to periodically initiate an optimization pass. For example, the pre-processor can initiate a pass approximately every 10 days and send new input data 902 to the optimizer 910A via an API call. Conversely, the optimizer 910A can initiate a pass by requesting the input data 902 from the pre-processor 900 via an API call. Since longer-term forecast data is generally more stable, the optimizer 910 generally performs passes at a lower rate than optimizer 910B.

In addition to the input data 902, the optimizer 910A receives (or is otherwise configured with) an objective function 912 and constraints 914, if any, which together form a model. Here, the optimizer 910A solves for a minimum number of hosts on which to pack demand based on medium-term pool forecasts. In particular, the optimizer 910A attempts to generate an optimal packing plan that specified an ideal fleet configuration given the forecasted demand. An exemplary mathematical optimization model that includes an objective function 912 in equation (8) and a set of constraints 914 in equations (9)-(11) follows. Note that there are notational differences between models (e.g., H in the example model for optimizer 510 is different than H in the example model below).

Parameters:
H: set of hardware types in the BU
$n_h$: number of hosts of hardware type $h \in H$
I: set of VM types in the BU
$T_h$: set of all templates defined for $h \in H$
$s_h^{it}$ : number of slots of size $i \in I$ present on template $t \in T_h$
$d^i$: number of slots of demand for VM type $i \in I$
Variables:
$x_h^t$: number of hosts of hardware type $h \in H$ configured with template $t \in Th$ to meet demand -continued Objective Function:

$$\text{minimize} \sum_{h \in H} \sum_{t \in T_h} x_h^t \qquad (8)$$

Constraints:

$$\sum_{t \in T_h} x_h^t \leq n_h \qquad h \in H \qquad (9)$$

$$\sum_{h \in H} \sum_{t \in T_h} s_h^{jt} x_h^t \geq d^i \qquad i \in I \qquad (10)$$

$$x_h^t \in Z_0^+ \qquad h \in H, t \in T_h \qquad (11)$$

In the above example model, the objective function equation (8) seeks to minimize the number of hosts across which to pack demand, where $x_h^t$ in the optimal solution represents the optimal packing plan. Constraint equation (9) limits the number of hosts to those available. Constraint equation (10) ensures that the solution creates sufficient pool sizes to satisfy demand. Since hosts are a discrete quantity, the optimizer 910A can be configured to limit the solution space to non-negative integers (e.g., constraint equation (11)).

Minimizing the number of hosts onto which to pack the medium-term forecast demand results in the "ideal" packing for that demand-independent of the current state of the fleet (e.g., which slots on which virtual machines are used or free, which hosts are currently associated with which templates, etc.). In other examples, an optimizer generating an optimal packing plan can consider the current state of the fleet. The optimizer can be configured to optimize the packing of the fleet based on the current state, constrained by a number of changes that can be set by a cloud provider operator. For example, the cloud provider operator can set the number of changes based on the ability of the fleet management services to change the state of the fleet. Increased fleet flexibility can correlate with an increased number of changes and vice versa.

The following is an example of the data that can be contained or otherwise represented in an exemplary optimal packing plan.

| HW_TYPE_A | Template_A: 25 |
| | Template_C: 30 |
| HW_TYPE_B | Template_B: 100 |
| | Template_G: 30 |
| ... | ... |

The optimal packing plan 916 provides guidance on how an optimal action plan can be generated in a manner similar to that described for optimizer 510. In particular, the optimizer 910B uses an optimal packing plan 916 to generate an optimal action plan 920 in a manner similar to optimizer 510 with additional input of optimal packing plan from optimizer 910A and modified constraints/objective. An exemplary objective function 918, equation (12), and set of constraints 919, including equations (2)-(7) and (13), to identify an optimal action plan follow.

Additional Parameters (from model for optimizer 510):
T: set of all templates across all hardware types in the BU -continued $$c_a^t = \begin{cases} 1 & \text{if a changes host to template } t \\ -1 & \text{if a changes host from template } t \end{cases}$$

$n^t$: number of times template t is should be present in the BU as retrieved from the optimal packing plan
$n_{cur}^t$: number of times template t is currently present in the BU
$z_1$: the relative objective weight of the total shortfall in the consumer pools
$z_2$: the relative objective weight of the total distance of the selected templates in the BU to the optimal packing plan
Additional Variables:
$\underline{q}^t$: the deficit of the number of times template t appears in the BU with respect to $n^t$
$\overline{q}^t$: the overage of the number of times template t appears in the BU with respect to $n^t$
Objective Function:

$$\text{minimize } z_1 \sum_{p \in P_c} \sum_{k=1}^{n_s^p} c_k^p \delta^p s_k^p + z_2 \sum_{t \in T} (\underline{q}^t + \overline{q}^t) \qquad (12)$$

Constraints:

$$\sum_{h \in H} \sum_{a \in A_h} c_a^t x_{h,a} + \underline{q}^t - \overline{q}^t = n^t - n_{cur}^t \quad t \in T \qquad (13)$$

In the above example model, the objective function equation (12) adds a distance factor into equation (1) with weights to adjust the relative importance of minimizing shortfalls versus distance to an optimal packing plan. In constraint equation (13), the expression (neur+$\Sigma_{h \in H} \Sigma_{\alpha \in A_h} c_a^t x_{h,a}$) represents the number of times template t is expected to be present in the BU upon the execution of the actions prescribed by an optimal packing plan. Thus, if that expression evaluates to a number smaller than $n^t$, $\underline{q}^t$ will assume a positive value. Conversely, if that expression evaluates to a larger smaller than $n^t$, $\underline{q}^t$ will assume a positive value. Provided $z_2>0$, $\underline{q}^t$ and $\overline{q}^t$ will not be simultaneously positive in an optimal solution of objective function equation (12).

The resulting optimal action plan 920 is of the form like that described for the optimal action plan 520, above.

Figure 10:
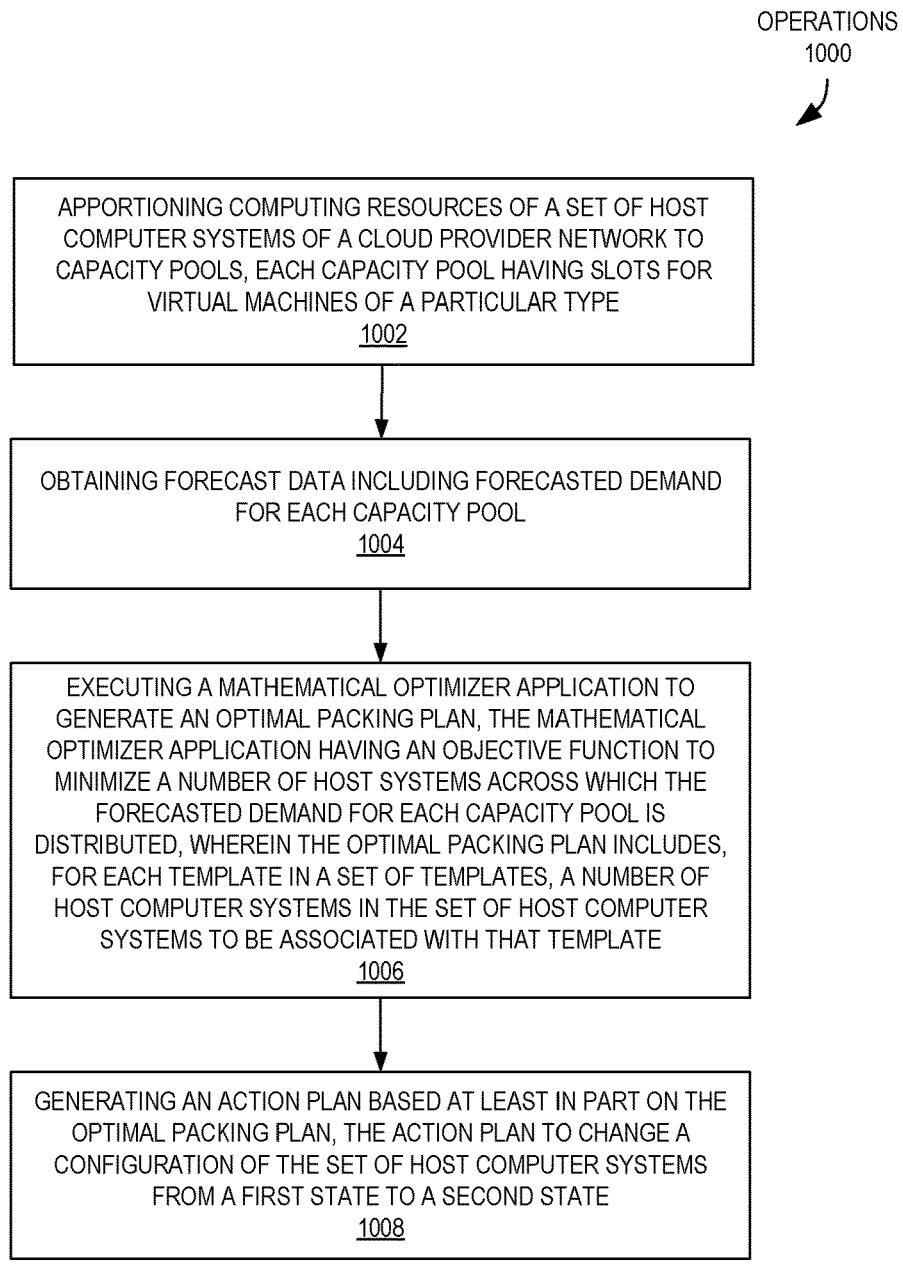
FIG. 10 is a flow diagram illustrating operations of a method for improving fleet packing according to some examples.

FIG. 10 is a flow diagram illustrating operations 1000 of a method for improving fleet packing according to some examples. Some or all of the operations 1000 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1000 are performed by fleet management services of the other figures.

The operations 1000 include, at block 1002, apportioning computing resources of a set of host computer systems of a cloud provider network to capacity pools, each capacity pool having slots for virtual machines of a particular type. The operations 1000 further include, at block 1004, obtaining forecast data including forecasted demand for each capacity pool. The operations 1000 further include, at block 1006, executing a mathematical optimizer application to generate an optimal packing plan, the mathematical optimizer application having an objective function to minimize a number of host systems across which the forecasted demand for each capacity pool is distributed, wherein the optimal packing plan includes, for each template in a set of templates, a number of host computer systems in the set of host computer systems to be associated with that template. The operations 1000 further include, at block 1008, generating an action plan based at least in part on the optimal packing plan, the action plan to change a configuration of the set of host computer systems from a first state to a second state.

Figure 11:
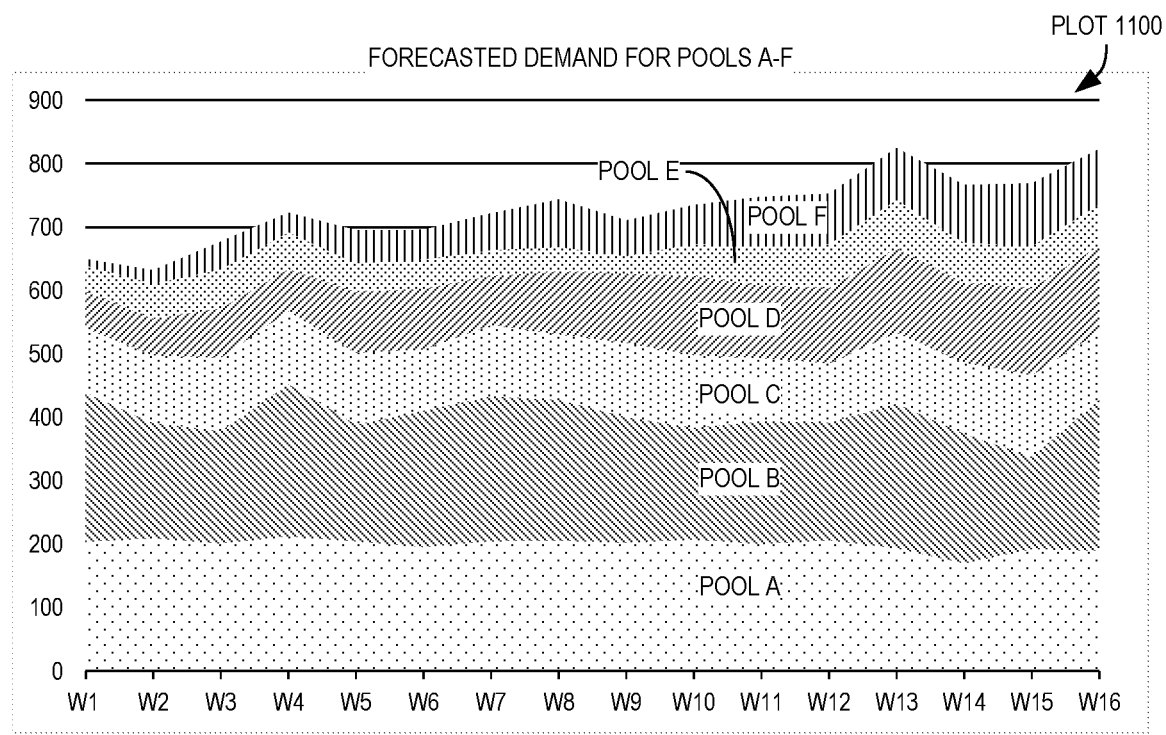
FIG. 11 is a diagram illustrating various virtual machine demand forecasts according to some embodiments.

FIG. 11 is a diagram illustrating various virtual machine demand forecasts according to some embodiments. Demand for any given capacity pool typically fluctuates over time. Such fluctuations naturally arise as cloud providers introduce new virtual machine types, deprecates old ones, and as customers develop new applications and technologies that have different resource demand profiles. Heterogenous templates present an opportunity to efficiently expand fleet capacity to meet long-term demand.

To illustrate, the plot 1100 shows an example 16-week stacked demand forecast for several different capacity pools. As can be seen, while the overall demand is increasing over time, so does the composition of the demand: demand for pool A is slowly shrinking, demand for pools B and E remains relatively stable, demand for pool C is growing slowly, while demands for pools D and F are growing quickly. Simultaneously, there are many different hardware types supporting many different templating options that can be deployed to meet the increasing demand, however that deployment takes time. As a result, determining the optimal composition of hardware to add to the fleet to support the increased demand is a challenging problem.

Figure 12:
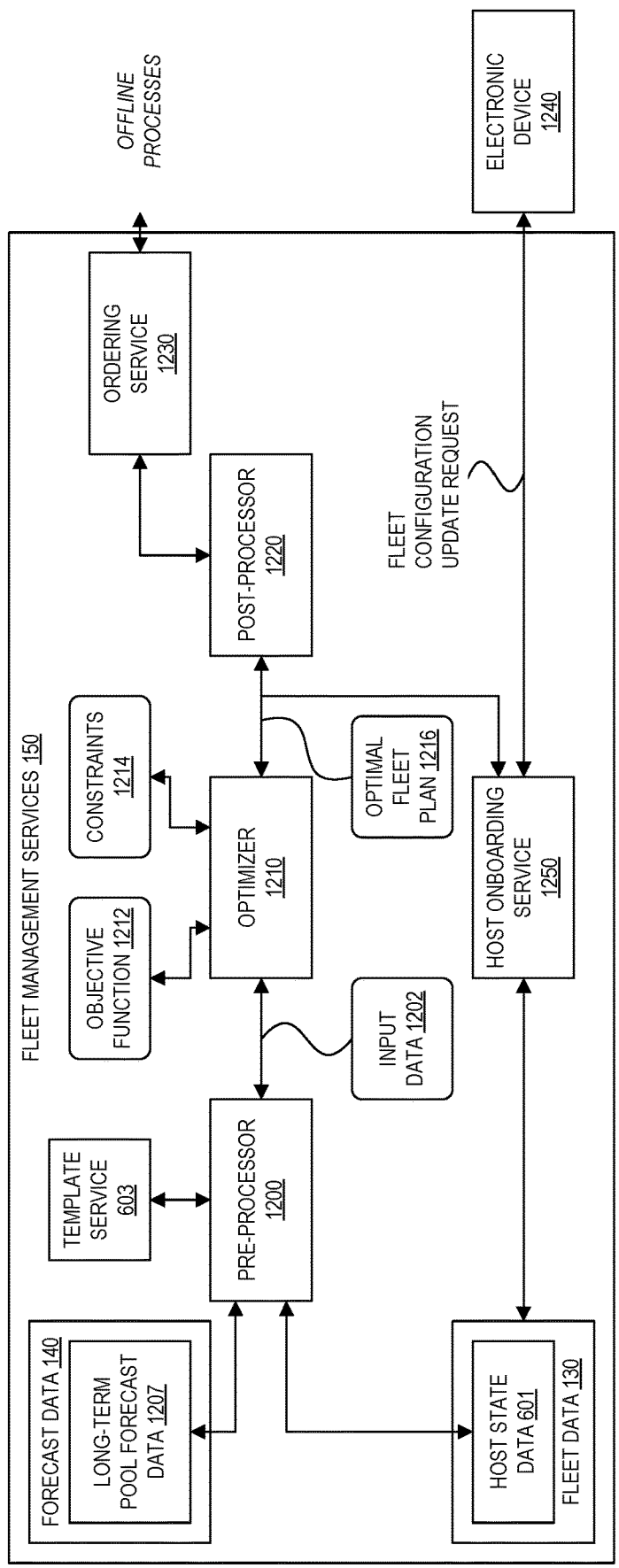
FIG. 12 is a diagram illustrating fleet management components of a cloud provider network to expand the fleet according to some examples.

FIG. 12 is a diagram illustrating fleet management components of a cloud provider network to expand the fleet according to some examples. As illustrated, fleet management services 150 include a pre-processor 1200, an optimizer 1210, a post-processor 1220, an ordering service 1230, and a host onboarding service 1250. Each of these components can be implemented as code (e.g., executable instructions, one or more computer programs, or one or more applications) executing on one or more processors.

The pre-processor 1200 collects data from various sources to prepare input data 1202 for the optimizer 1210. One input data 1202 item is the number of slots, in each template, for a given virtual machine type (e.g., $s_{jkl}$ in the below parameters), which the pre-processor can compute from the set of templates. Another input data 1202 item is long-term pool forecast data 1207 for the pools in the balancing unit from the forecast data 140 (e.g., $u_i$ in the below parameters). An exemplary long-term forecast horizon is 8 weeks in the future. The pre-processor can obtain the long-term forecasted demand from the long-term pool forecast data 1207. Another input data 1202 item is the number existing of hosts of each hardware type (e.g., $a_{jl}$ in the below parameters), which may be maintained in fleet data 130 and available to the pre-processor 1200. The pre-processor can send the input data 902 item(s) to the optimizer 1210.

The pre-processor can also calculate one or more sets (e.g., $T_{ji}$, $T_{jl}$, and $T_{jli}$ in the below parameters) to subdivide the solution space, reducing the complexity of the problem.

In addition to the input data 1202, the optimizer 1210 receives (or is otherwise configured with) an objective function 1212 and constraints 1214, if any. Here, the optimizer 1210 solves to minimize the number of new hosts to add to the fleet of existing hosts to meet long-term pools forecasts. In particular, the optimizer 1210 attempts to generate an optimal fleet profile that identifies the optimal packing of existing hosts as well as the optimal composition and packing of new hosts. An exemplary mathematical optimization model that includes an objective function 1212, equation (14), and set of constraints 1214, equations (15)-(16), follows. Since hosts are a discrete quantity, the optimizer 1210 can be configured to limit the solution space to non-negative integers.

---

Parameters:
I is the set of virtual machine types in the balancing unit (or fleet)
J is the set of hardware types in the balancing unit
$T_j$ is the set of all templates for platform j, $k \in T_j$
$s_{jkl}$ is the number of slots for VM type i in template k on hardware type j
$u_i$ is the total forecasted demand for VM type i
$G_j$ is the set of groups of identical hosts of hardware type j, $l \in G_j$
$a_{jl}$ is the number of available hosts in group l of hardware type j
$T_{ji}$ is the set of templates of hardware type j that has at least one slot for VM type i
$T_{jl}$ is the set of templates for group l of hardware type j, $k \in T_j$
$T_{jli}$ is the set of templates for group l of hardware type j that have at least one slot for VM type i
$x_{jlk}$ is the number of hosts of hardware type j from group l shaped to template k
$y_{jk}$ is the number of new hosts of hardware type j shaped to template k Objective Function:

$$\text{minimize} \sum_{j \in J} \sum_{k \in T_j} y_{jk} \quad (14)$$

Constraints:

$$\sum_{j \in J} \sum_{l \in G_j} \sum_{k \in T_{jli}} s_{jki} x_{jlk} + \sum_{j \in J} \sum_{k \in T_{ji}} s_{jki} y_{jk} \geq u_i \quad (15)$$

$$\sum_{k \in T_{ji}} \quad (16)$$

---

In the above example model, the objective function equation (14) seeks to minimize the number of new hosts needed to meet demand $u_i$, where $y_{jk}$ in represents the optimal set and configuration of new hosts for the fleet or balancing unit. The left term of the sum of constraint equation (15) represents the packing of existing hosts (a relative of the optimal packing plan described above but with the additional freedom of $y_{jk}$), while the right term of the sum of constraint equation (15) represents the packing of additional hosts to satisfy demand $u_i$. Constraint Equation (16) limits the left term of constraint equation (15) to the current number of hosts in the fleet.

In some examples, the term $y_{jk}$ of the objective function of equation (14) can be divided by a density term that represents the number of hosts of hardware type j that can fit within a standard data center rack. Such a modification can be used in the case where hosts are ordered in units of racks.

In some examples, the optimal fleet plan includes is an expansion plan that includes an identification and configuration of new hosts (e.g., $y_{jk}$ in equation (14)). In other examples, the optimal fleet plan further includes an identification and configuration of existing hosts (e.g., $x_{jlk}$ in equation (15)).

The post-processor 1220 receives an optimal fleet plan 1216 from the optimizer 1220. The post-processor 1220 can send one or more requests to an ordering service 1230. The requests can include, for each hardware type of new hosts identified in the fleet plan 1216, a quantity of new hosts to order. In some examples, the post-processor 1220 may round up the number of new hosts to an integer multiple of the number of hosts of the particular type that fit within a rack. Upon receiving an order request, the ordering service 1230 can initiate one or more offline processes to source, build, and install new hosts in the fleet.

Once the new hosts have been installed and connected to the cloud provider network, an operator can cause an electronic device 1240 to submit a request to a host onboarding service 1250 to add the newly installed hosts to the fleet. The request can include, for each host, an identification of the host (e.g., a network address) and a hardware type identifier. The host onboarding service can prepare an updated fleet configuration file that includes an identification of the hosts in the fleet and update the fleet data 130. Once fleet data 130 has been updated, the other components of the cloud provider network, such as the virtualization services 110, can begin using the newly added capacity. Additionally, the various fleet management services 150 can begin to evaluate the newly added capacity as part of the one or more optimizations described herein.

In some examples, either the pre-processor 1200 or the optimizer 1210 includes a timer to periodically initiate an optimization pass. For example, the pre-processor can initiate a pass approximately once a week and send new input data 1202 to the optimizer 1210 via an API call. Conversely, the optimizer 1210 can initiate a pass by requesting the input data 1202 from the pre-processor 1200 via an API call.

In some examples, the optimizer 1210 can perform a plurality of optimization passes for each of a plurality of time horizons. For example, the optimizer can perform an optimization pass for 8-week forecast data, 7-week forecast data, 6-week forecast data, and 5-week forecast data. Since forecast data can change over time (e.g., the 2-week forecast may be different from the 1-week forecast the following week), the need for new hosts can change. In some examples, the post-processor 1220 tracks the differences between corresponding plans at different weeks. For example, the post-processor 1220 can compare the week 7 forecasts at time t to the week 8 forecasts at time t minus one week. Based on these differences, the post-processor 1220 can adjust the ordering pipeline via the ordering service 1230 by either canceling existing orders, reducing future orders, or expediting orders. For example, the post-processor may determine that the number of new hosts of a particular hardware type in the above example for week 8 at time t minus one week was 10 and the corresponding number of new hosts of the hardware type for week 7 at time t was 7, resulting in an order issued the prior week having an extra three hosts. To address the excess capacity, the post-processor 1220 can adjust the number of new hosts of that hardware type that it requests from the ordering service 1230 in the current week by three or cancel the excess in the earlier order with the ordering service 1230, if possible. As another example, the post-processor may determine that the number of new hosts of a particular hardware type in the above example for week 8 at time t minus one week was 10 and the corresponding number of new hosts of the hardware type for week 7 at time t was 12, resulting in an order issued the prior week having a shortage of two hosts. In such a case, the post-processor 1220 can send a request to the ordering service 1230 to expedite an order for two additional hosts of that hardware type.

FIG. 13 is a flow diagram illustrating operations 1300 of a method for expanding a fleet according to some examples. Some or all of the operations 1300 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1300 are performed by fleet management services of the other figures.

The operations 1300 include, at block 1302, obtaining first forecast data including a forecasted demand for virtual machines in each capacity pool of a set of capacity pools, wherein each capacity pool represents a number of slots of host computer system resources from a set of host computer systems for virtual machines of a particular type. The operations 1300 further include, at block 1304, executing a mathematical optimizer application to generate a first optimal fleet plan, the mathematical optimizer application having an objective function to minimize a number of new host computer systems to add to the set of host computer systems to satisfy the forecasted demand for each capacity pool, wherein the first optimal fleet plan includes an identification of a set of hardware types and, for each hardware type in the set, a quantity of new host computer systems of the hardware type. The operations 1300 further include, at block 1306, deploying, based on the first optimal fleet plan, for a hardware type in the set of hardware types, a plurality of new host computer systems of that hardware type into the set of host computer systems.

Figure 14:
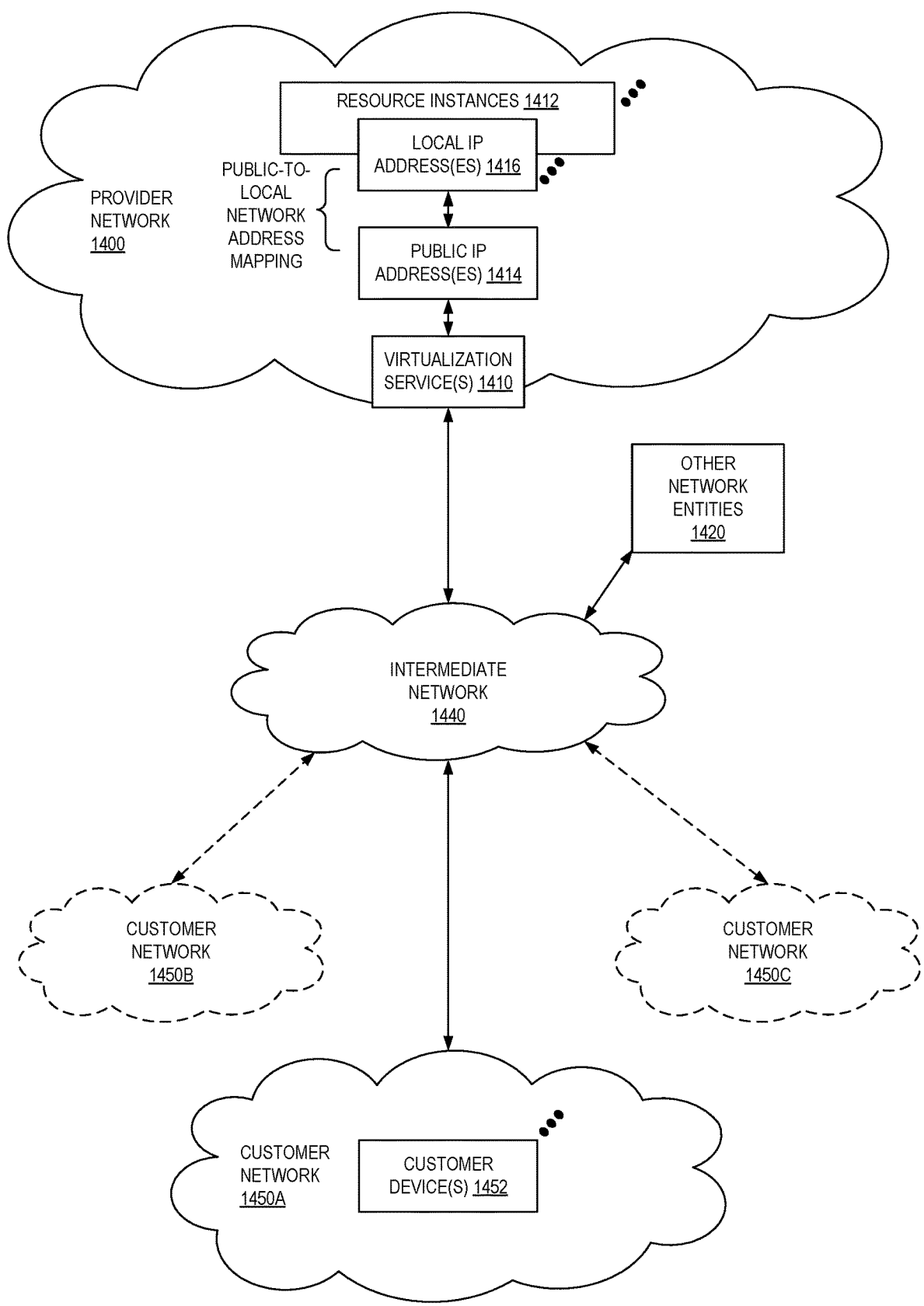
FIG. 14 illustrates an example provider network environment according to some examples.

FIG. 14 illustrates an example provider network (or "service provider system") environment according to some examples. A provider network 1400 can provide resource virtualization to customers via one or more virtualization services 1410 that allow customers to purchase, rent, or otherwise obtain instances 1412 of virtualized resources, including but not limited to computation and storage resources, implemented on devices within the provider network or networks in one or more data centers. Local Internet Protocol (IP) addresses 1416 can be associated with the resource instances 1412; the local IP addresses are the internal network addresses of the resource instances 1412 on the provider network 1400. In some examples, the provider network 1400 can also provide public IP addresses 1414 and/or public IP address ranges (e.g., Internet Protocol version 4 (IPv4) or Internet Protocol version 6 (IPv6) addresses) that customers can obtain from the provider 1400.

Conventionally, the provider network 1400, via the virtualization services 1410, can allow a customer of the service provider (e.g., a customer that operates one or more customer networks 1450A-1450C (or "client networks") including one or more customer device(s) 1452) to dynamically associate at least some public IP addresses 1414 assigned or allocated to the customer with particular resource instances 1412 assigned to the customer. The provider network 1400 can also allow the customer to remap a public IP address 1414, previously mapped to one virtualized computing resource instance 1412 allocated to the customer, to another virtualized computing resource instance 1412 that is also allocated to the customer. Using the virtualized computing resource instances 1412 and public IP addresses 1414 provided by the service provider, a customer of the service provider such as the operator of the customer network(s) 1450A-1450C can, for example, implement customer-specific applications and present the customer's applications on an intermediate network 1440, such as the Internet. Other network entities 1420 on the intermediate network 1440 can then generate traffic to a destination public IP address 1414 published by the customer network(s) 1450A-1450C; the traffic is routed to the service provider data center, and at the data center is routed, via a network substrate, to the local IP address 1416 of the virtualized computing resource instance 1412 currently mapped to the destination public IP address 1414. Similarly, response traffic from the virtualized computing resource instance 1412 can be routed via the network substrate back onto the intermediate network 1440 to the source entity 1420.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1400; a customer can then assign their allocated public IP addresses to particular resource instances allocated to the customer. These public IP addresses can be referred to as customer public IP addresses, or simply customer IP addresses. Instead of being assigned by the provider network 1400 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 15:
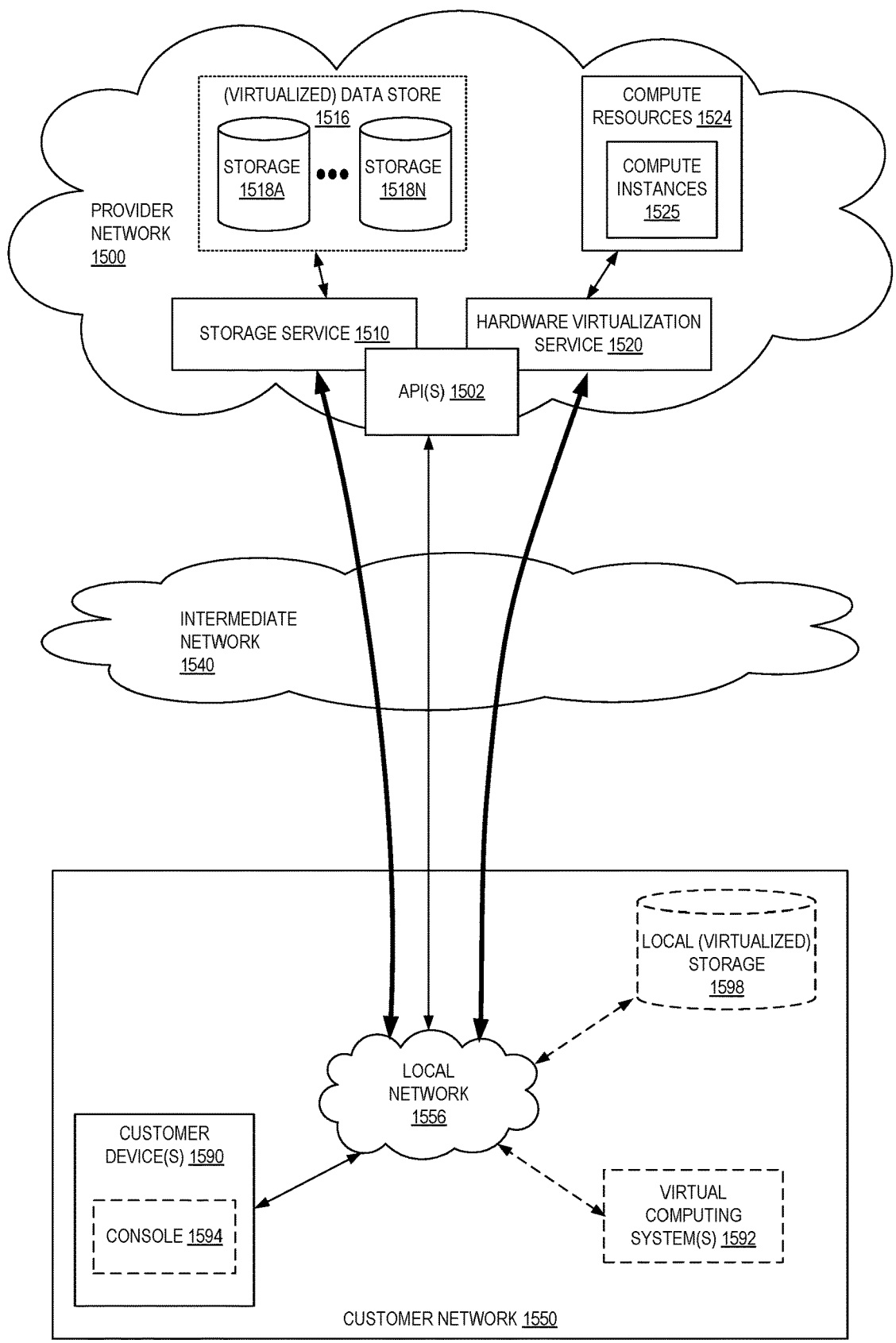
FIG. 15 is a block diagram of an example provider network that provides a storage service and a hardware virtualization service to customers according to some examples.

FIG. 15 is a block diagram of an example provider network environment that provides a storage service and a hardware virtualization service to customers, according to some examples. A hardware virtualization service 1520 provides multiple compute resources 1524 (e.g., compute instances 1525, such as VMs) to customers. The compute resources 1524 can, for example, be provided as a service to customers of a provider network 1500 (e.g., to a customer that implements a customer network 1550). Each computation resource 1524 can be provided with one or more local IP addresses. The provider network 1500 can be configured to route packets from the local IP addresses of the compute resources 1524 to public Internet destinations, and from public Internet sources to the local IP addresses of the compute resources 1524.

The provider network 1500 can provide the customer network 1550, for example coupled to an intermediate network 1540 via a local network 1556, the ability to implement virtual computing systems 1592 via the hardware virtualization service 1520 coupled to the intermediate network 1540 and to the provider network 1500. In some examples, the hardware virtualization service 1520 can provide one or more APIs 1502, for example a web services interface, via which the customer network 1550 can access functionality provided by the hardware virtualization service 1520, for example via a console 1594 (e.g., a web-based application, standalone application, mobile application, etc.) of a customer device 1590. In some examples, at the provider network 1500, each virtual computing system 1592 at the customer network 1550 can correspond to a computation resource 1524 that is leased, rented, or otherwise provided to the customer network 1550.

From an instance of the virtual computing system(s) 1592 and/or another customer device 1590 (e.g., via console 1594), the customer can access the functionality of a storage service 1510, for example via the one or more APIs 1502, to access data from and store data to storage resources 1518A-1518N of a virtual data store 1516 (e.g., a folder or "bucket," a virtualized volume, a database, etc.) provided by the provider network 1500. In some examples, a virtualized data store gateway (not shown) can be provided at the customer network 1550 that can locally cache at least some data, for example frequently accessed or critical data, and that can communicate with the storage service 1510 via one or more communications channels to upload new or modified data from a local cache so that the primary store of data (the virtualized data store 1516) is maintained. In some examples, a user, via the virtual computing system 1592 and/or another customer device 1590, can mount and access virtual data store 1516 volumes via the storage service 1510 acting as a storage virtualization service, and these volumes can appear to the user as local (virtualized) storage 1598.

While not shown in FIG. 15, the virtualization service(s) can also be accessed from resource instances within the provider network 1500 via the API(s) 1502. For example, a customer, appliance service provider, or other entity can access a virtualization service from within a respective virtual network on the provider network 1500 via the API(s) 1502 to request allocation of one or more resource instances within the virtual network or within another virtual network.

Illustrative Systems

Figure 16:
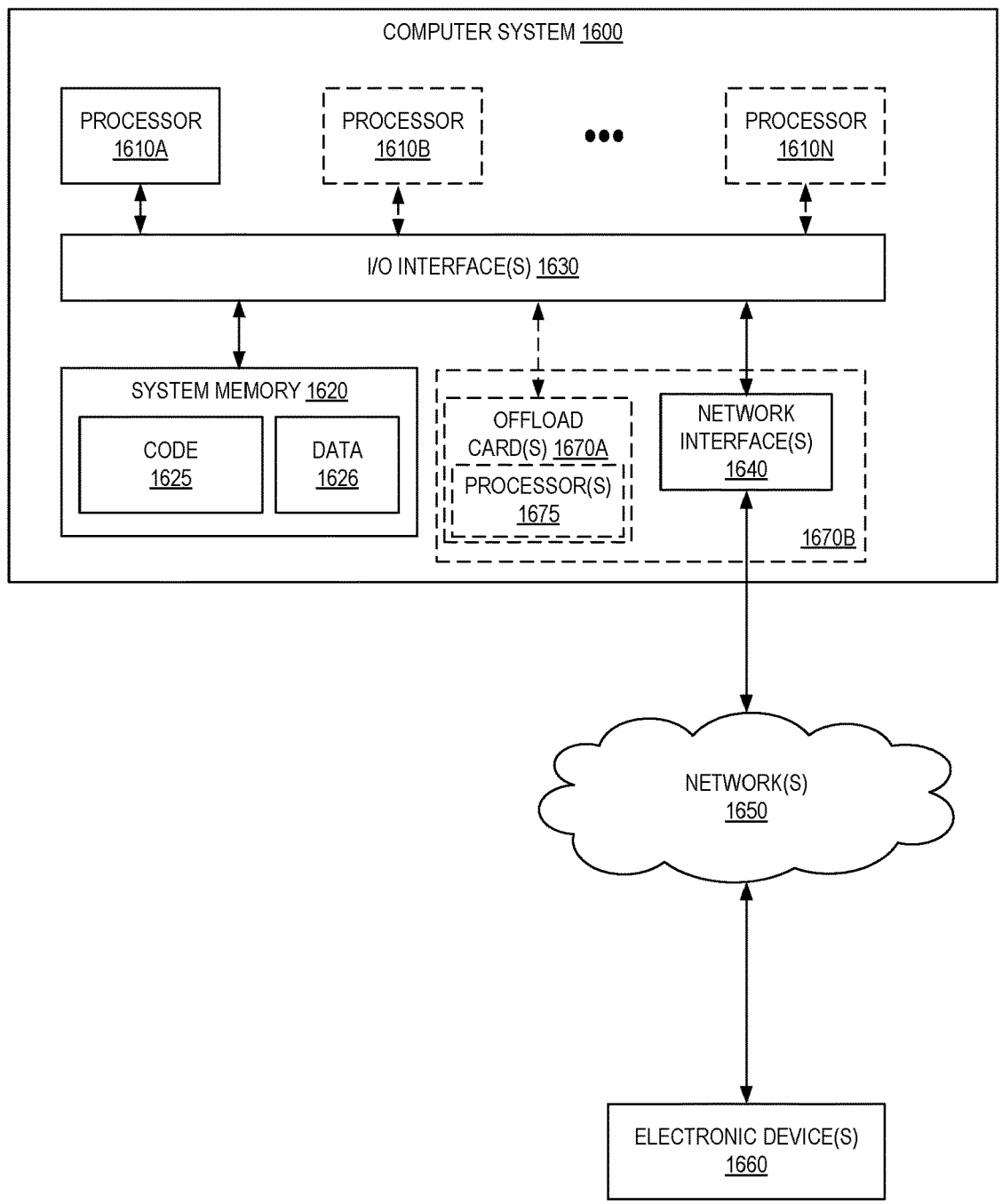
FIG. 16 is a block diagram illustrating an example computer system that can be used in some examples.

In some examples, a system that implements a portion or all of the techniques described herein can include a general-purpose computer system, such as the computer system 1600 illustrated in FIG. 16, that includes, or is configured to access, one or more computer-accessible media. In the illustrated example, the computer system 1600 includes one or more processors 1610 coupled to a system memory 1620 via an input/output (I/O) interface 1630. The computer system 1600 further includes a network interface 1640 coupled to the I/O interface 1630. While FIG. 16 shows the computer system 1600 as a single computing device, in various examples the computer system 1600 can include one computing device or any number of computing devices configured to work together as a single computer system 1600.

In various examples, the computer system 1600 can be a uniprocessor system including one processor 1610, or a multiprocessor system including several processors 1610 (e.g., two, four, eight, or another suitable number). The processor(s) 1610 can be any suitable processor(s) capable of executing instructions. For example, in various examples, the processor(s) 1610 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1610 can commonly, but not necessarily, implement the same ISA.

The system memory 1620 can store instructions and data accessible by the processor(s) 1610. In various examples, the system memory 1620 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1620 as code 1625 (e.g., executable to implement, in whole or in part, the various components of the cloud management services 108 such as virtualization services 110, fleet management services 150) and data 1626 (e.g., to store various data such as fleet data 130 or portions thereof such as host state data 601 and pool state data 605, forecast data 140).

In some examples, the I/O interface 1630 can be configured to coordinate I/O traffic between the processor 1610, the system memory 1620, and any peripheral devices in the device, including the network interface 1640 and/or other peripheral interfaces (not shown). In some examples, the I/O interface 1630 can perform any necessary protocol, timing, or other data transformations to convert data signals from one component (e.g., the system memory 1620) into a format suitable for use by another component (e.g., the processor 1610). In some examples, the I/O interface 1630 can include support for devices attached through various types of peripheral buses, such as a variant of the Peripheral Component Interconnect (PCI) bus standard or the Universal Serial Bus (USB) standard, for example. In some examples, the function of the I/O interface 1630 can be split into two or more separate components, such as a north bridge and a south bridge, for example. Also, in some examples, some or all of the functionality of the I/O interface 1630, such as an interface to the system memory 1620, can be incorporated directly into the processor 1610.

The network interface 1640 can be configured to allow data to be exchanged between the computer system 1600 and other devices 1660 attached to a network or networks 1650, such as other computer systems or devices as illustrated in FIG. 1, for example. In various examples, the network interface 1640 can support communication via any suitable wired or wireless general data networks, such as types of Ethernet network, for example. Additionally, the network interface 1640 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1600 includes one or more offload cards 1670A or 1670B (including one or more processors 1675, and possibly including the one or more network interfaces 1640) that are connected using the I/O interface 1630 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1600 can act as a host electronic device (e.g., operating as part of a hardware virtualization service) that hosts compute resources such as compute instances, and the one or more offload cards 1670A or 1670B execute a virtualization manager that can manage compute instances that execute on the host electronic device. As an example, in some examples the offload card(s) 1670A or 1670B can perform compute instance management operations, such as pausing and/or un-pausing compute instances, launching and/or terminating compute instances, performing memory transfer/copying operations, etc. These management operations can, in some examples, be performed by the offload card(s) 1670A or 1670B in coordination with a hypervisor (e.g., upon a request from a hypervisor) that is executed by the other processors 1610A-1610N of the computer system 1600. However, in some examples the virtualization manager implemented by the offload card(s) 1670A or 1670B can accommodate requests from other entities (e.g., from compute instances themselves), and can not coordinate with (or service) any separate hypervisor.

In some examples, the system memory 1620 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1600 via the I/O interface 1630. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1600 as the system memory 1620 or another type of memory. Further, a computer-accessible medium can include transmission media or signals such as electrical, electromagnetic, or digital signals, conveyed via a communication medium such as a network and/or a wireless link, such as can be implemented via the network interface 1640.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C#or C++, or any scripting language, such as Perl, Python, PHP, or TCL, as well as combinations thereof. The server(s) can also include database servers, including without limitation those commercially available from Oracle(R), Microsoft (R), Sybase (R), IBM (R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1518A-1518N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   apportioning computing resources of a fleet of host computer systems of a cloud provider network to capacity pools, each capacity pool having slots for virtual machines of a particular type, wherein a particular type of virtual machine is based on an amount of resources of a host system allocated to the virtual machine type, wherein the resources include a compute capacity, a memory capacity, and a network throughput;
   obtaining forecast data, wherein the forecast data includes, for each capacity pool, a forecasted demand in a number of slots;
   executing a mathematical optimizer application to generate an optimal fleet plan, the mathematical optimizer application having an objective function to minimize a number of new host computer systems to add to the fleet to satisfy the forecasted demand for each capacity pool, wherein the optimal fleet plan includes an identification of a set of hardware types and, for each hardware type in the set, a quantity of new host computer systems of the hardware type; and
   deploying, based on the optimal fleet plan, for a hardware type in the set of hardware types, the quantity of new host computer systems of the hardware type into the fleet of host computer systems.

2. The computer-implemented method of claim 1, wherein the deploying comprises:
   receiving an indication that the quantity of new host computer systems is available to the fleet of host computer systems; and
   updating a fleet configuration file to include an identification of each new host computer system.

3. The computer-implemented method of claim 1, wherein the mathematical optimizer application is an integer linear optimizer.

4. A computer-implemented method comprising:
   obtaining first forecast data including a forecasted demand for virtual machines in each capacity pool of a set of capacity pools, wherein each capacity pool represents a number of slots of host computer system resources from a set of host computer systems for virtual machines of a particular type;
   executing a mathematical optimizer application to generate a first optimal fleet plan, the mathematical optimizer application having an objective function to minimize a number of new host computer systems to add to the set of host computer systems to satisfy the forecasted demand for each capacity pool, wherein the first optimal fleet plan includes an identification of a set of hardware types and, for each hardware type in the set, a quantity of new host computer systems of the hardware type; and
   deploying, based on the first optimal fleet plan, for a hardware type in the set of hardware types, a plurality of new host computer systems of that hardware type into the set of host computer systems.

5. The computer-implemented method of claim 4, wherein the deploying comprises:
   receiving an indication that the plurality of new host computer systems is available to the set of host computer systems; and
   updating a fleet configuration file to include an identification of each new host computer system in the plurality of new host computer systems.

6. The computer-implemented method of claim 4, further comprising:
   ordering, based on the first optimal fleet plan, for a hardware type in the set, the quantity of host computer systems of the hardware type into the set of host computer systems.

7. The computer-implemented method of claim 6, further comprising:
   obtaining second forecast data including a forecasted demand for virtual machines in each capacity pool of a set of capacity pools, wherein the second forecast data is for a different time than the first forecast data;

executing the mathematical optimizer application to generate a second optimal fleet plan, wherein the second optimal fleet plan includes an indication of a quantity of a particular hardware type that is different than a corresponding quantity in the first optimal fleet plan; and updating an order based on a difference between the quantity of the particular hardware type in the second optimal fleet plan and the corresponding quantity in the first optimal fleet plan.

8. The computer-implemented method of claim 4, wherein each host computer system is associated with a template of a set of templates, wherein the template divides resources of the host computer system into one or more slots, and wherein the objective function is based at least in part on a possible mapping of the set of templates to the plurality of new host computer systems.

9. The computer-implemented method of claim 4, wherein the mathematical optimizer application is an integer linear optimizer.

10. The computer-implemented method of claim 4, wherein a template divides host computer system resources into one or more slots and further comprising:
calculating a set of templates of a particular hardware type that have at least one slot for a particular virtual machine type to reduce a solution space of the mathematical optimizer application; and
providing the set of templates to the mathematical optimizer application.

11. The computer-implemented method of claim 4, wherein a template divides host computer system resources into one or more slots and further comprising:
calculating a set of templates for a group of identical host computer systems of a particular hardware type to reduce a solution space of the mathematical optimizer application; and
providing the set of templates to the mathematical optimizer application.

12. The computer-implemented method of claim 4, wherein a template divides host computer system resources into one or more slots and further comprising:
calculating a set of templates for a group of identical host computer systems of a particular hardware type that have at least one slot for a particular virtual machine type to reduce a solution space of the mathematical optimizer application; and
providing the set of templates to the mathematical optimizer application.

13. A system comprising:
a first plurality of host computer systems of a cloud provider network, wherein the first plurality of host computer systems form a set of host computer systems, and wherein the computing resources of the set of host computer systems are apportioned to capacity pools, each capacity pool having slots for virtual machines of a particular type; and
one or more electronic devices to implement fleet management services in the cloud provider network, the fleet management services including instructions that upon execution cause the fleet management services to:
execute a mathematical optimizer application to generate a first optimal fleet plan, the mathematical optimizer application having an objective function to minimize a number of new host computer systems to add to the set of host computer systems to satisfy the forecasted demand for each capacity pool, wherein the first optimal fleet plan includes an identification of a set of hardware types and, for each hardware type in the set, a quantity of new host computer systems of the hardware type; and
deploy, based on the first optimal fleet plan, for a hardware type in the set of hardware types, a plurality of new host computer systems of that hardware type into the set of host computer systems.

14. The system of claim 13, wherein the instructions that upon execution cause the fleet management services to deploy the plurality of new host computer systems include instructions to:
receive an indication that the plurality of new host computer systems is available to the set of host computer systems; and
update a fleet configuration file to include an identification of each new host computer system in the plurality of new host computer systems.

15. The system of claim 13, wherein the fleet management services include further instructions that upon execution cause the fleet management services to:
order, based on the first optimal fleet plan, for a hardware type in the set, the quantity of host computer systems of the hardware type into the set of host computer systems.

16. The system of claim 13, wherein the fleet management services include further instructions that upon execution cause the fleet management services to:
obtain second forecast data including a forecasted demand for virtual machines in each capacity pool of a set of capacity pools, wherein the second forecast data is for a different time than the first forecast data;
execute the mathematical optimizer application to generate a second optimal fleet plan, wherein the second optimal fleet plan includes an indication of a quantity of a particular hardware type that is different than a corresponding quantity in the first optimal fleet plan; and
update an order based on a difference between the quantity of the particular hardware type in the second optimal fleet plan and the corresponding quantity in the first optimal fleet plan.

17. The system of claim 13, wherein each host computer system is associated with a template of a set of templates, wherein the template divides resources of the host computer system into one or more slots, and wherein the objective function is based at least in part on a possible mapping of the set of templates to the plurality of new host computer systems.

18. The system of claim 13, wherein the mathematical optimizer application is an integer linear optimizer.

19. The system of claim 13, wherein a template divides host computer system resources into one or more slots, and wherein the fleet management services include further instructions that upon execution cause the fleet management services to:
calculate a set of templates of a particular hardware type that have at least one slot for a particular virtual machine type to reduce a solution space of the mathematical optimizer application; and
provide the set of templates to the mathematical optimizer application.

20. The system of claim 13, wherein a template divides host computer system resources into one or more slots, and wherein the fleet management services include further instructions that upon execution cause the fleet management services to:

calculate a set of templates for a group of identical host computer systems of a particular hardware type to reduce a solution space of the mathematical optimizer application; and provide the set of templates to the mathematical optimizer application.

* * * * *